US010432287B2

(12) United States Patent
Park et al.

(10) Patent No.: US 10,432,287 B2
(45) Date of Patent: Oct. 1, 2019

(54) METHOD FOR TRANSMITTING/RECEIVING CHANNEL STATE INFORMATION IN WIRELESS COMMUNICATION SYSTEM, AND DEVICE FOR SAME

(71) Applicant: LG ELECTRONICS INC., Seoul (KR)

(72) Inventors: Jonghyun Park, Seoul (KR); Kijun Kim, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/767,124

(22) PCT Filed: Oct. 7, 2016

(86) PCT No.: PCT/KR2016/011258
§ 371 (c)(1),
(2) Date: Apr. 9, 2018

(87) PCT Pub. No.: WO2017/061822
PCT Pub. Date: Apr. 13, 2017

(65) Prior Publication Data
US 2019/0074883 A1      Mar. 7, 2019

Related U.S. Application Data

(60) Provisional application No. 62/238,153, filed on Oct. 7, 2015, provisional application No. 62/238,702, filed on Oct. 8, 2015, provisional application No. 62/239,289, filed on Oct. 9, 2015, provisional application No. 62/257,159, filed on Nov. 18, 2015.

(51) Int. Cl.
*H04B 7/06*     (2006.01)
*H04B 7/04*     (2017.01)
(Continued)

(52) U.S. Cl.
CPC ............. *H04B 7/0626* (2013.01); *H04B 7/04* (2013.01); *H04B 7/06* (2013.01); *H04B 7/0617* (2013.01);
(Continued)

(58) Field of Classification Search
CPC .. H04B 7/0626; H04B 7/0617; H04B 17/345; H04W 24/10; H04W 72/0446; H04L 1/0026
See application file for complete search history.

(56) References Cited

U.S. PATENT DOCUMENTS

2012/0157082 A1   6/2012   Pedersen et al.
2014/0126402 A1   5/2014   Nam et al.
(Continued)

OTHER PUBLICATIONS

PCT/KR2016/007332 (Year: 2015).*
(Continued)

*Primary Examiner* — Siu M Lee
(74) *Attorney, Agent, or Firm* — Lee Hong Degerman Kang & Waimey

(57) ABSTRACT

Disclosed are a method for transmitting/receiving channel state information in a wireless communication system and a device for same. In particular, a method of reporting channel state information (CSI), by a user equipment (UE) in a wireless communication system comprises the steps of: receiving, from an eNB, a CSI process configuration comprising interference measurement restriction information indicating interference measurement restriction; and reporting, to the eNB, CSI corresponding to a CSI process configured by the CSI process configuration, wherein when a first subframe set and a second subframe set are configured for the CSI process, the interference measurement restriction can be independently configured for each of the first subframe set and the second subframe set.

12 Claims, 13 Drawing Sheets

(51) Int. Cl.
*H04B 17/345* (2015.01)
*H04L 1/00* (2006.01)
*H04W 24/10* (2009.01)
*H04W 72/04* (2009.01)

(52) U.S. Cl.
CPC ......... *H04B 17/345* (2015.01); *H04L 1/0026* (2013.01); *H04W 24/10* (2013.01); *H04W 72/0446* (2013.01)

(56) References Cited

U.S. PATENT DOCUMENTS

2015/0043469 A1    2/2015  Kim et al.
2015/0139009 A1*  5/2015  Park .................. H04W 72/1231
                                                                 370/252
2017/0063503 A1*  3/2017  Liu ....................... H04L 5/0048

OTHER PUBLICATIONS

PCT International Application No. PCT/KR2016/011258, Written Opinion of the International Searching Authority dated Jan. 26, 2017, 9 pages.
Huawei, et al., "Discussion on CSI-RS measurement restriction", 3GPP TSG RAN WG1 Meeting #82bis, R1-155956, Oct. 2015, 5 pages.
Huawei, et al., "CSI process with or without Imr and related interference measurement", 3GPP TSG RAN WG1 Meeting #82bis, R1-155072, Oct. 2015, 7 pages.

* cited by examiner

FIG. 12
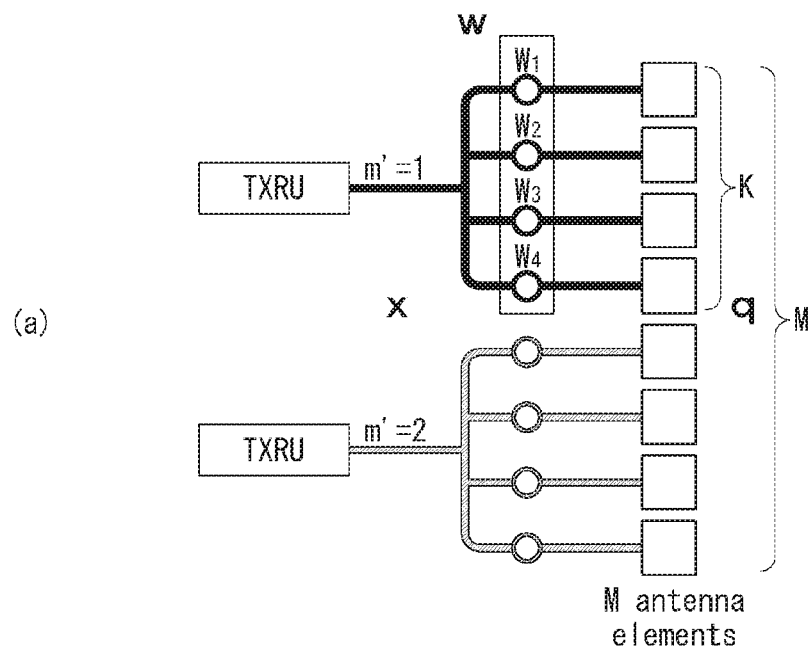
(a)
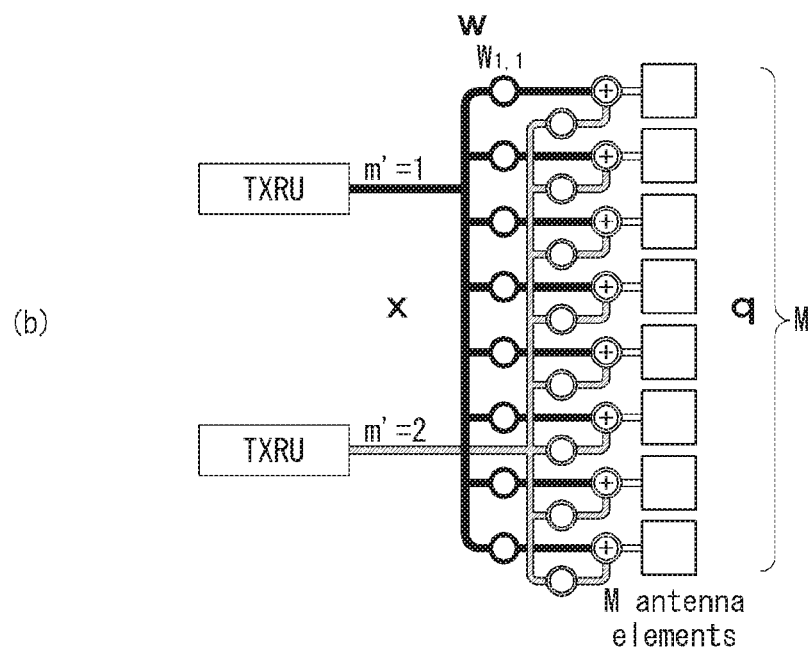
(b)

000# METHOD FOR TRANSMITTING/RECEIVING CHANNEL STATE INFORMATION IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2016/011258, filed on Oct. 7, 2016, which claims the benefit of U.S. Provisional Application No. 62/238,153, filed on Oct. 7, 2015, 62/238,702, filed on Oct. 8, 2015, 62/239,289, filed on Oct. 9, 2015, and 62/257,159, filed on Nov. 18, 2015, the contents of which are all hereby incorporated by reference herein in their entirety.

TECHNICAL FIELD

The present invention relates to a wireless communication system and, more particularly, to a method of transmitting/receiving channel state information (CSI) and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to provide is to propose a method of transmitting/receiving channel state information (CSI).

Furthermore, an object of the present invention is to propose a method for channel and/or interference measurement restriction and, in particular, to propose a method for channel and/or interference measurement restriction if a plurality of subframe sets is configured for a single CSI process.

Furthermore, an object of the present invention is to propose a method of improving the capacity of a sounding reference signal (SRS).

Technological objects to be achieved by the present invention are not limited to the aforementioned objects, and other objects that have not been described may be clearly understood by a person having ordinary skill in the art to which the present invention pertains from the following description.

Technical Solution

In an aspect of the present invention, a method for a user equipment to report channel state information (CSI) in a wireless communication system includes receiving, from an eNB, a CSI process configuration comprising interference measurement restriction information indicating interference measurement restriction and reporting, to the eNB, CSI corresponding to a CSI process configured by the CSI process configuration. When a first subframe set and a second subframe set are configured for the CSI process, the interference measurement restriction may be independently configured for each of the first subframe set and the second subframe set.

In another aspect of the present invention, a user equipment transmitting system channel state information (CSI) in a wireless communication includes a radio frequency (RF) unit for transmitting/receiving a radio signal and a processor controlling the RF unit. The processor is configured to receive, from an eNB, a CSI process configuration comprising interference measurement restriction information indicating interference measurement restriction and to report, to the eNB, CSI corresponding to a CSI process configured by the CSI process configuration. When a first subframe set and a second subframe set are configured for the CSI process, the interference measurement restriction may be independently configured for each of the first subframe set and the second subframe set.

Preferably, the CSI process configuration may comprise channel measurement restriction information indicating channel measurement restriction, and the channel measurement restriction may be configured in common for the first subframe set and the second subframe set.

Preferably, the channel measurement restriction may be applied to only a CSI process of a beamformed CSI-RS type.

Preferably, when the interference measurement restriction is configured, interference measurement may be derived based on a channel state information-interference measurement (CSI-IM) resource of only one subframe in order to calculate a channel quality indicator (CQI).

Preferably, when the channel measurement restriction is configured, channel measurement may be derived based on a none zero power (NZP) CSI-RS of a channel state information-reference signal (CSI-RS) resource of only one subframe in order to calculate a channel quality indicator (CQI).

Preferably, when the interference measurement restriction may be configured, interference measurement may be derived based on a channel state information-interference measurement (CSI-IM) resource belonging to a previously configured measurement window in order to calculate a channel quality indicator (CQI).

Preferably, when the channel measurement restriction is configured, channel measurement may be derived based on a none zero power (NZP) CSI-RS of a channel state information-reference signal (CSI-RS) resource belonging to the previously configured measurement window in order to calculate the channel quality indicator (CQI).

Preferably, user equipment capability information indicating whether the measurement window is supported for the interference measurement restriction and/or the channel measurement restriction may be transmitted to the eNB.

Preferably, the user equipment capability information may be transmitted to the eNB for only a physical uplink control channel (PUCCH)-based periodic CSI report.

Preferably, a parameter for determining the measurement window for the interference measurement restriction and/or the channel measurement restriction may be negotiated with the eNB.

Advantageous Effects

In accordance with an embodiment of the present invention, more accurate channel state information can be obtained or the operation of a UE can be simplified by defining a method of configuring channel and/or interference measurement restriction in a single CSI process in which a plurality of subframe sets is configured in a wireless communication system supporting multiple antennas.

Furthermore, in accordance with an embodiment of the present invention, an SRS capacity can be increased using more UpPTS symbols than existing symbols or using a virtual cell-ID in a wireless communication system supporting multiple antennas.

Effects which may be obtained by the present invention are not limited to the aforementioned effects, and other effects that have not been described may be clearly understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 12 illustrates a transceiver unit model in a wireless communication system to which the present invention may be applied.

MODE FOR INVENTION

Figure 1:
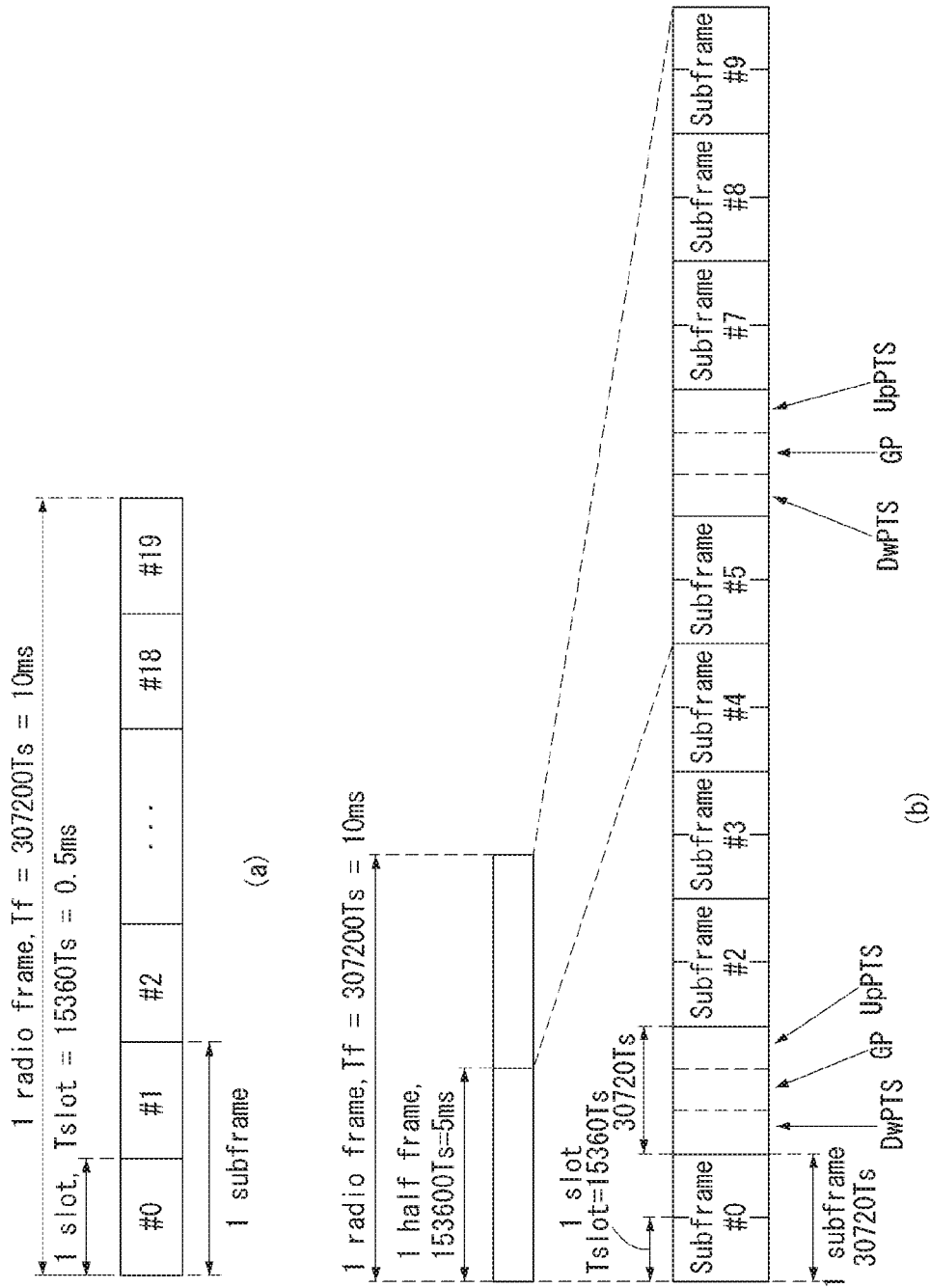
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to frequency division duplex (FDD) and a radio frame structure which may be applicable to time division duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of orthogonal frequency division multiplexing (OFDM) symbols in the time domain and includes a plurality of resource blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a downlink pilot time slot (DwPTS), a guard period (GP), and an uplink pilot time slot (UpPTS).

A DwPTS is used for an initial cell search, synchronization or channel estimation in a UE. An UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes a slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
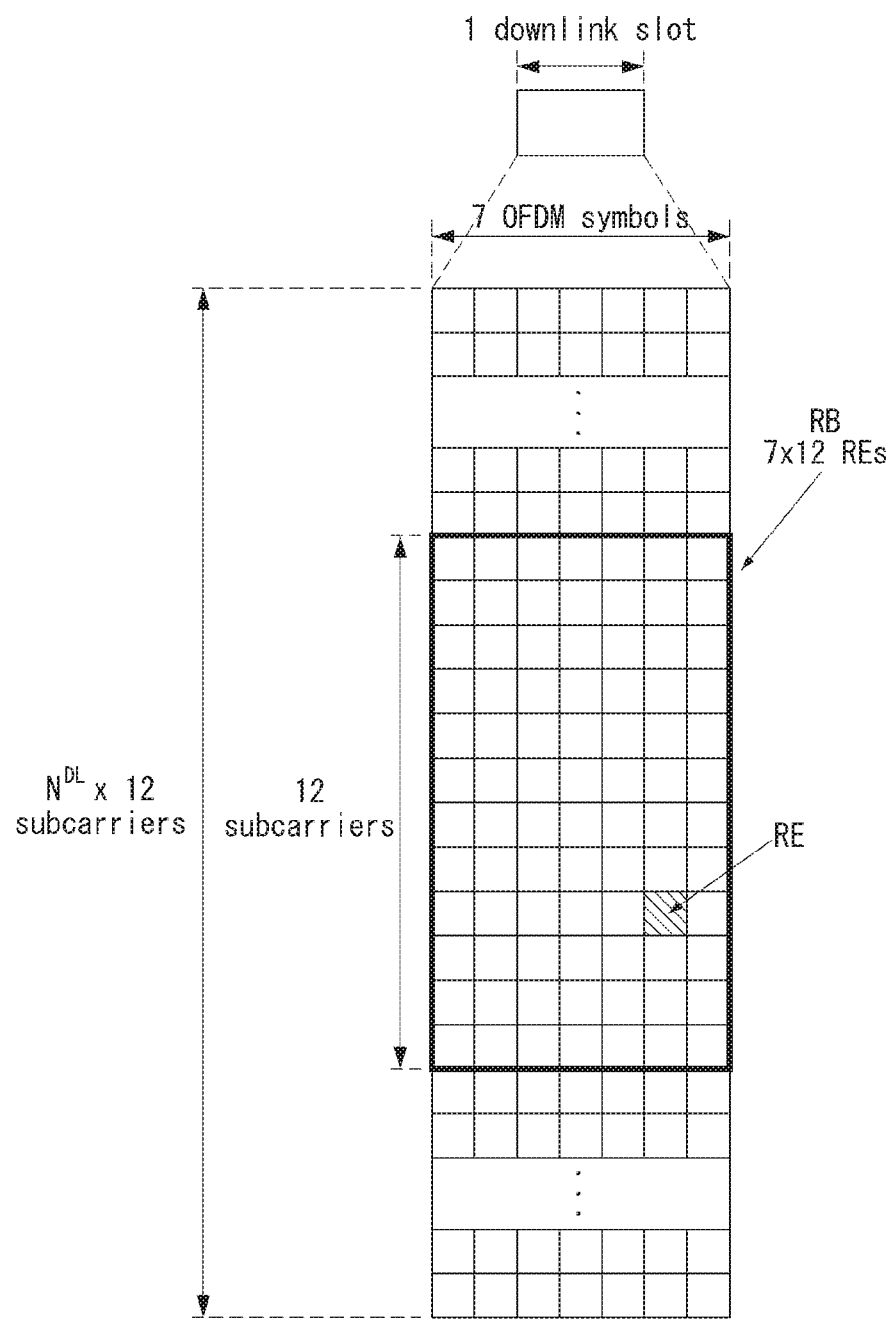
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

Figure 3:
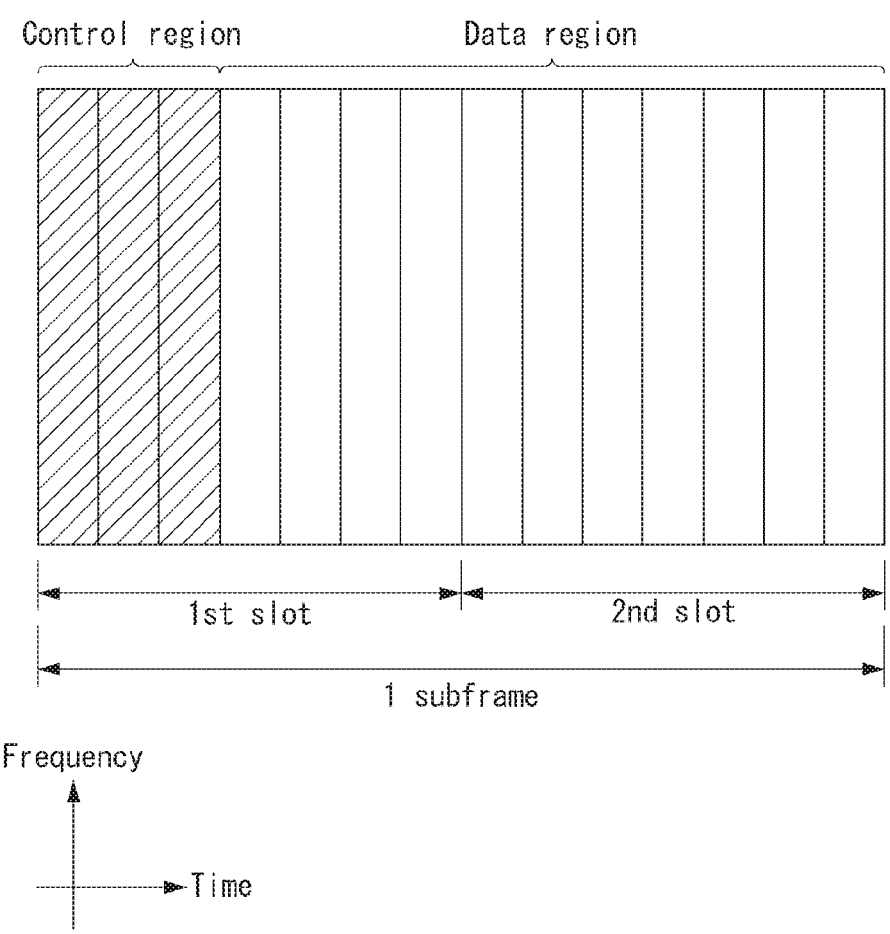
FIG. 3 illustrates the structure of a downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called an "uplink grant"), paging information on a PCH, system information on a DL-SCH, the resource allocation of a higher layer control message, such as a random access response transmitted on a PDSCH, a set of transmission power control commands for individual UE within specific UE group, and the activation of a voice over Internet protocol (VoIP), etc. A plurality of PDCCHs may be transmitted within the control region, and UE may monitor a plurality of PDCCHs. A PDCCH is transmitted on a single control channel element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a cyclic redundancy check (CRC) to control information. A unique identifier (a radio network temporary identifier (RNTI)) is masked to the CRC depending on the owner or use of a PDCCH. If the PDCCH is a PDCCH for specific UE, an identifier unique to the UE, for example, a cell-RNTI (C-RNTI) may be masked to the CRC. If the PDCCH is a PDCCH for a paging message, a paging indication identifier, for example, a paging-RNTI (P-RNTI) may be masked to the CRC. If the PDCCH is a PDCCH for system information, more specifically, a system information block (SIB), a system information identifier, for example, a system information-RNTI (SI-RNTI) may be masked to the CRC. A random access- RNTI (RA-RNTI) may be masked to the CRC in order to indicate a random access response which is a response to the transmission of a random access preamble by UE.

Figure 4:
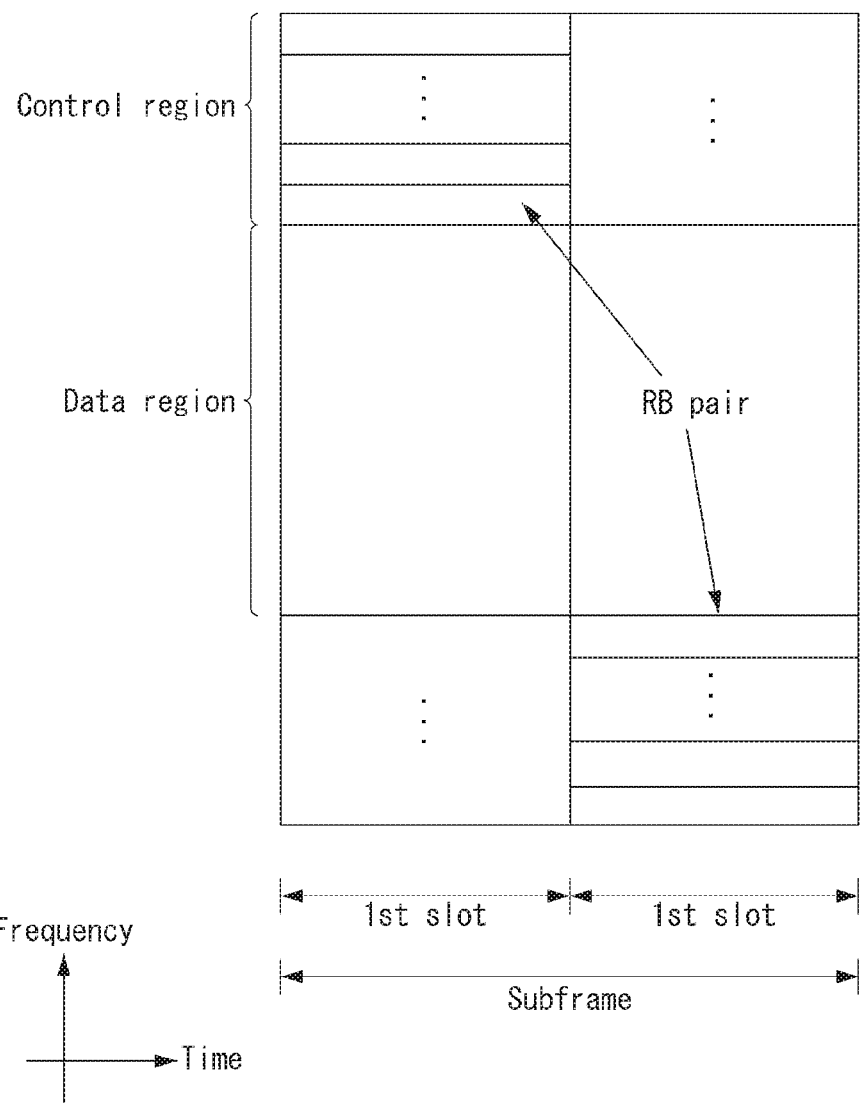
FIG. 4 illustrates the structure of an uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
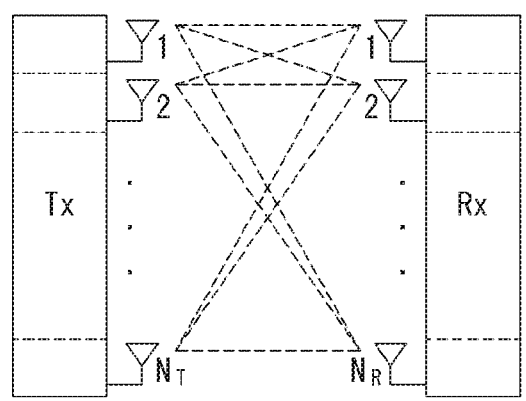
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \Lambda, s_{N_T}] \quad \text{[Equation 2]}$$

Meanwhile, transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s}=[\hat{s}_1,\hat{s}_2,\Lambda,\hat{s}_{N_T}]^T=[P_1s_1,P_2s_2,\Lambda,P_{N_T}s_{N_T}]^T \quad \text{[Equation 3]}$$

Furthermore, transmission information having controlled transmission power in the Equation 3 may be represented as follows using the diagonal matrix P of transmission power.

$$\hat{s}=\begin{bmatrix} P_1 & & & 0 \\ & P_2 & & \\ & & O & \\ 0 & & & P_{N_T} \end{bmatrix}\begin{bmatrix} s_1 \\ s_2 \\ M \\ s_{N_T} \end{bmatrix}=Ps \quad \text{[Equation 4]}$$

Meanwhile, the information vector having controlled transmission power in the Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x=\begin{bmatrix} x_1 \\ x_2 \\ M \\ x_i \\ M \\ x_{N_T} \end{bmatrix}=\begin{bmatrix} w_{11} & w_{12} & \Lambda & w_{1N_T} \\ w_{21} & w_{22} & \Lambda & w_{2N_T} \\ M & & O & \\ w_{i1} & w_{i2} & \Lambda & w_{iN_T} \\ M & & O & \\ w_{N_T1} & w_{N_T2} & \Lambda & w_{N_TN_T} \end{bmatrix}\begin{bmatrix} \hat{s}_1 \\ \hat{s}_2 \\ M \\ \hat{s}_j \\ M \\ \hat{s}_{N_T} \end{bmatrix}=W\hat{s}=WPs \quad \text{[Equation 5]}$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y=[y_1,y_2,\Lambda,y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
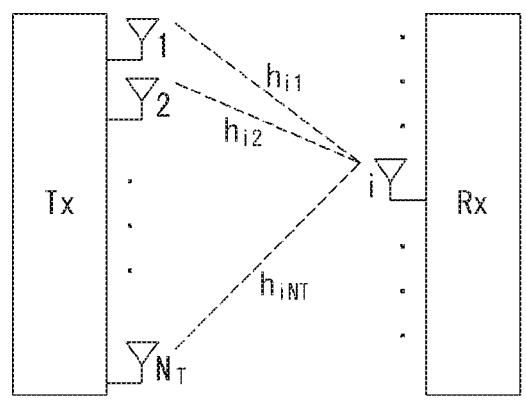
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2},\Lambda,h_{iN_T}] \quad \text{[Equation 7]}$$

Furthermore, if all channels from the N_T transmission antenna to NR reception antennas are represented through a matrix expression, such as Equation 7, they may be represented as follows.

$$H=\begin{bmatrix} h_1^T \\ h_2^T \\ M \\ h_i^T \\ M \\ h_{N_R}^T \end{bmatrix}=\begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R1} & h_{N_R2} & \Lambda & h_{N_RN_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n=[n_1,n_2,\Lambda,n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y=\begin{bmatrix} y_1 \\ y_2 \\ M \\ y_i \\ M \\ y_{N_R} \end{bmatrix}=\begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R1} & h_{N_R2} & \Lambda & h_{N_RN_T} \end{bmatrix}\begin{bmatrix} x_1 \\ x_2 \\ M \\ x_j \\ M \\ x_{N_T} \end{bmatrix}+\begin{bmatrix} n_1 \\ n_2 \\ M \\ n_i \\ M \\ n_{N_R} \end{bmatrix}= \quad \text{[Equation 10]}$$

$$Hx+n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H)\leq\min(N_T,N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 7:
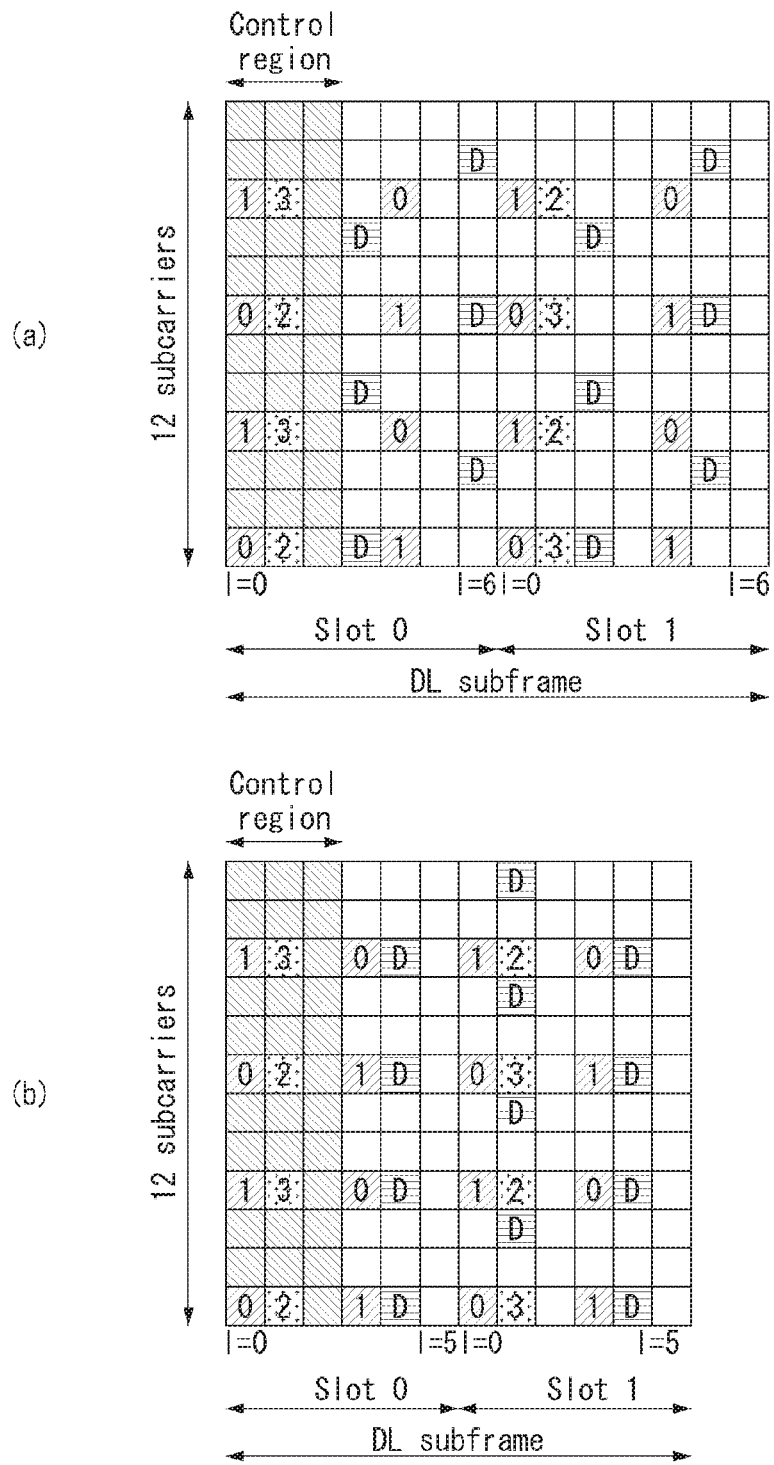
FIG. 7 illustrates reference signal patterns mapped to downlink resource block pairs in a wireless communication system to which the present invention may be applied.

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 7.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval $\Delta f=15$ kHz.

In a subframe configured for CSI-RS transmission, a CSI-RS sequence is mapped to a complex-valued modulation symbol a_k,l^(p) used as a reference symbol on each antenna port p as in Equation 12.

$$a_{k,l}^{(p)} = w_{l''} \cdot r_{l,n_s}(m')$$ [Equation 12]

$$k = k' + 12m +$$
$$\begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| CSI reference signal con-figuration | Number of CSI reference signals configured |||||| 
|---|---|---|---|---|---|---|
| | 1 or 2 || 4 || 8 ||
| | (k', l') | n_s mod 2 | (k', l') | n_s mod 2 | (k', l') | n_s mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |

TABLE 3-continued

| CSI reference signal con-figuration | Number of CSI reference signals configured |||||| 
|---|---|---|---|---|---|---|
| | 1 or 2 || 4 || 8 ||
| | (k', l') | n_s mod 2 | (k', l') | n_s mod 2 | (k', l') | n_s mod 2 |
| | 18 | (3, 5) | 1 | | | | |
| | 19 | (2, 5) | 1 | | | | |
| Frame structure type 2 only | | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Table 4 illustrates the mapping of (k',l') from a CSI-RS configuration in an extended CP.

TABLE 4

| CSI reference signal con-figuration | Number of CSI reference signals configured |||||| 
|---|---|---|---|---|---|---|
| | 1 or 2 || 4 || 8 ||
| | (k', l') | n_s mod 2 | (k', l') | n_s mod 2 | (k', l') | n_s mod 2 |
| Frame structure type 1 and 2 | | | | | | |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame structure type 2 only | | | | | | |
| 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

Figure 8:
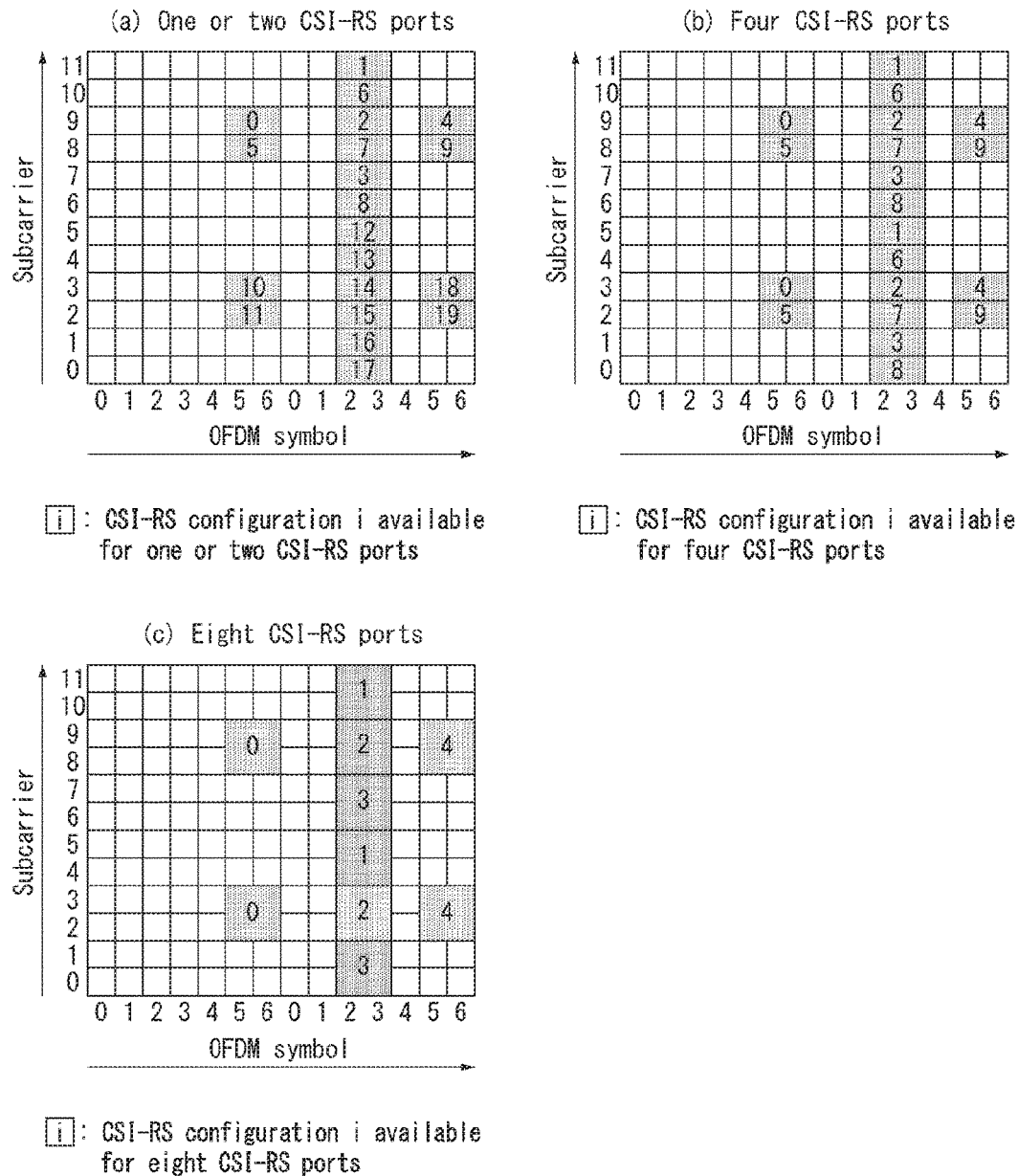
FIG. 8 is a diagram illustrating resources to which reference signals are mapped in a wireless communication system to which the present invention may be applied.

FIG. 8 is a diagram illustrating resources to which reference signals are mapped in a wireless communication system to which the present invention may be applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS) that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

$$(10n_f + \lfloor n_s/2 \rfloor - \Delta_{CSI-RS}) \mod T_{CSI-RS} = 0 \quad \text{[Equation 13]}$$

In Equation 13, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is $\rho\_A$.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

Figure 9:
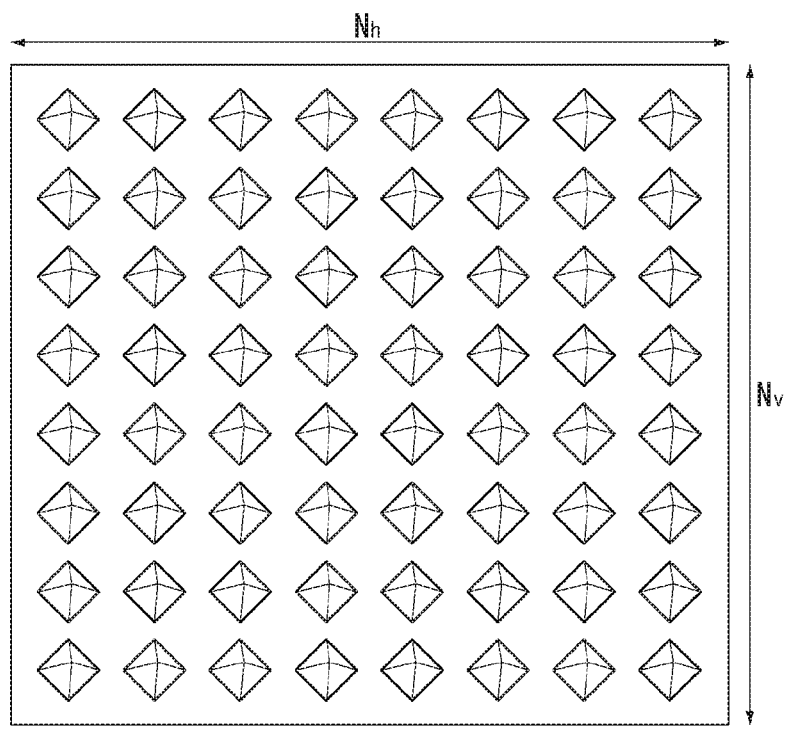
FIG. 9 illustrates a 2D-AAS having 64 antenna elements in a wireless communication system to which the present invention may be applied.

FIG. 9 illustrates a 2D-AAS having 64 antenna elements in a wireless communication system to which the present invention may be applied.

FIG. 9 illustrates a common 2D antenna array. A case where $N\_t=N\_v \cdot N\_h$ antennas has a square form as in FIG. 9 may be considered. In this case, $N\_h$ indicates the number of antenna columns in a horizontal direction, and $N\_v$ indicates the number of antenna rows in a vertical direction.

If the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

Figure 10:
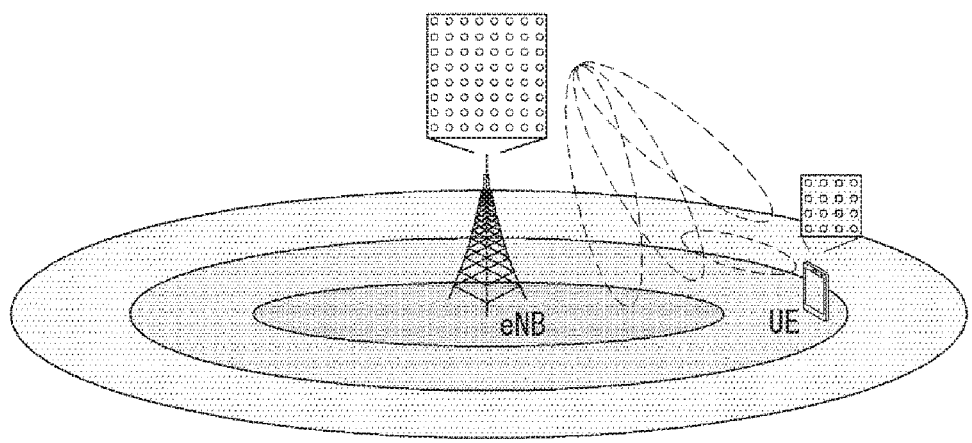
FIG. 10 illustrates a system in which an eNB or UE has a plurality of transmission/reception antennas capable of forming a 3D beam based on the AAS in a wireless communication system to which the present invention may be applied.

FIG. 10 illustrates a system in which an eNB or UE has a plurality of transmission/reception antennas capable of forming a 3D beam based on the AAS in a wireless communication system to which the present invention may be applied.

FIG. 10 is a diagram of the aforementioned example and illustrates a 3D MIMO system using a 2D antenna array (i.e., 2D-AAS).

From the point of view of a transmission antenna, if a 3D beam pattern is used, a semi-static or dynamic beam can be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB can receive a signal from a UE through a plurality of antennas. In this case, there is an advantage in that the UE can set its transmission power very low by considering the gain of the massive reception antenna in order to reduce an interference influence.

Figure 11:
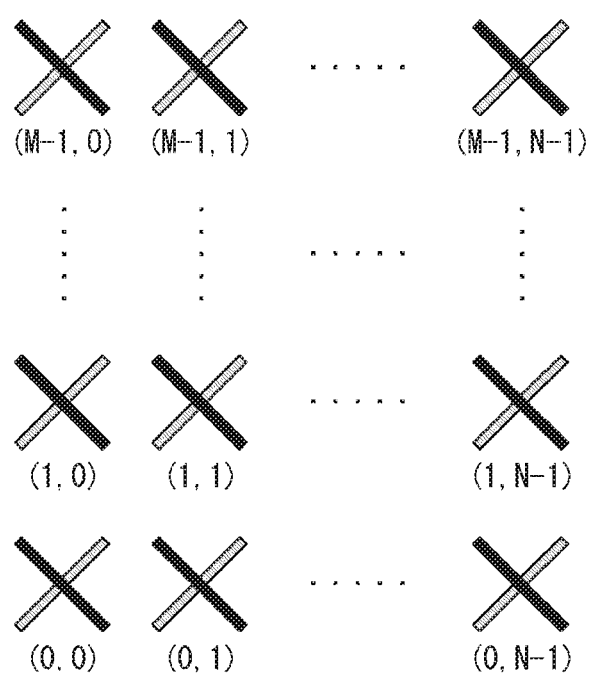
FIG. 11 illustrates a 2D antenna system having cross-polarizations in a wireless communication system to which the present invention may be applied.

FIG. 11 illustrates a 2D antenna system having cross-polarizations in a wireless communication system to which the present invention may be applied.

A 2D planar antenna array model in which polarization is considered may be diagrammed as shown in FIG. 11.

Unlike the existing MIMO system according to a passive antenna, a system based on an active antenna can dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 11, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 11, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmit diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements. In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

FIG. 12 illustrates a transceiver unit model in a wireless communication system to which the present invention may be applied.

In the 1D TXRU virtualization, M_TXRU TXRUs are related to M antenna elements configured in a single column antenna array having the same polarization.

In the 2D TXRU virtualization, a TXRU model configuration corresponding to the antenna array model configuration (M, N, P) of FIG. 11 may be represented by (M_TXRU, N, P). In this case, M_TXRU means the number of TXRUs present in the 2D same column and same polarization, and always satisfies M_TXRU≤M. That is, the total number of TXRUs is the same as M_TXRU×N×P.

A TXRU virtualization model may be divided into a TXRU virtualization model option-1: sub-array partition model as in FIG. 12(a) and a TXRU virtualization model option-2: full connection model as in FIG. 12(b) depending on a correlation between an antenna element and a TXRU.

Referring to FIG. 12(a), in the case of the sub-array partition model, an antenna element is partitioned into multiple antenna element groups, and each TXRU is connected to one of the groups.

Referring to FIG. 12(b), in the case of the full-connection model, the signals of multiple TXRUs are combined and transferred to a single antenna element (or the arrangement of antenna elements).

In FIG. 12, q is the transmission signal vectors of antenna elements having M co-polarizations within one column. W is a wideband TXRU virtualization vector, and W is a wideband TXRU virtualization matrix. X is the signal vectors of M_TXRU TXRUs.

In this case, mapping between an antenna port and TXRUs may be one-to-one or one-to-many.

In FIG. 12, mapping between a TXRU and an antenna element (TXRU-to-element mapping) shows one example, but the present invention is not limited thereto. From the point of view of hardware, the present invention may be identically applied to mapping between an TXRU and an antenna element which may be implemented in various forms.

Sounding Reference Signal (SRS)

An SRS is chiefly used for channel quality measurement in order to perform uplink frequency-selective scheduling, and is not related to the transmission of uplink data and/or control information, but is not limited thereto. The SRS may be used for various other purposes for supporting the improvement of power control or various start-up functions of UEs that have not been recently scheduled. For example, the start-up functions may include an initial modulation and coding scheme (MCS), initial power control for data transmission, timing advance, and frequency semi-selective scheduling. In this case, the frequency semi-selective scheduling refers to scheduling in which a frequency resource is selectively allocated to the first slot of a subframe and a frequency resource is allocated to the second slot of a subframe after pseudo-random hopping to another frequency.

Furthermore, the SRS may be used to measure downlink channel quality on the assumption that a wireless channel between uplink and downlink is reciprocal. Such an assumption is particularly valid in a time division duplex (TDD) system in which uplink and downlink share the same frequency spectrum and are separated in a time domain.

The subframes of an SRS transmitted by a specific UE within a cell may be indicated by a cell-specific broadcast signal. A 4-bit cell-specific "srsSubframeConfiguration" parameter indicates an array of 15 possible subframes that may be transmitted through each radio frame by an SRS. Such arrays provide the flexibility of the coordination of SRS overhead according to a deployment scenario.

The 16 array of the arrays fully turns off the switch of an SRS within a cell, and this is chiefly suitable for a serving cell that serves high-speed UEs.

Figure 13:
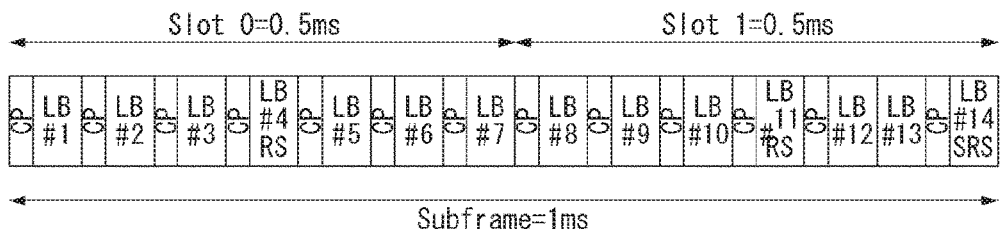
FIG. 13 illustrates an uplink subframe including a sounding reference signal symbol in a wireless communication system to which the present invention may be applied.

FIG. 13 illustrates an uplink subframe including a sounding reference signal symbol in a wireless communication system to which the present invention may be applied.

Referring to FIG. 13, the SRS is always transmitted through the last SC-FDMA symbol on arranged subframes. Accordingly, an SRS and a DMRS are located in different SC-TDMA symbols.

PUSCH data transmission is not permitted in a specific SC-FDMA symbol for SRS transmission. As a result, if sounding overhead is the highest, that is, although an SRS symbol is included in all of subframes, sounding overhead does not exceed about 7%.

Each SRS symbol is generated by a basic sequence regarding a given time unit and frequency band (a sequence set based on a random sequence or Zadoff-Ch(ZC)). All of UEs within the same cell use the same basic sequence. In this case, SRS transmissions from a plurality of UEs within the same cell in the same frequency band and the same time are orthogonal to each other by different cyclic shifts of the basic sequence and are different.

SRS sequences from different cells may be distinguished by allocating a different basic sequence to each cell, but orthogonality is not guaranteed between the different basic sequences.

Method of Enhancing Sounding Reference Signal (SRS) Capacity

An SRS Capacity Enhancement Scheme

1. Introduction

In release (Rel)-13, at least the following SRS capacity enhancement scheme is regulated.

i) An increase of the number of UpPTS SC-FDMA symbols for an SRS ii) An increase of the number of combs up to 4

2. Discussion for SRS Enhancement i) An increase of the number of UpPTS SC-FDMA symbols for an SRS FIG. 14 illustrates reception timing of a scheduled UE in a DwPTS when an enhanced SRS is transmitted in a wireless communication system to which the present invention may be applied.

In a current LTE standard, a special subframe of a TDD system includes three fields, a DwPTS, a GP, and an UpPTS. The DwPTS is used to allocate downlink transmission, and the UpPTS is used for uplink transmission. The GP may be considered as a gap for controlling propagation delay for a UE that will be scheduled on the DwPTS and the UpPTS.

Figure 14:
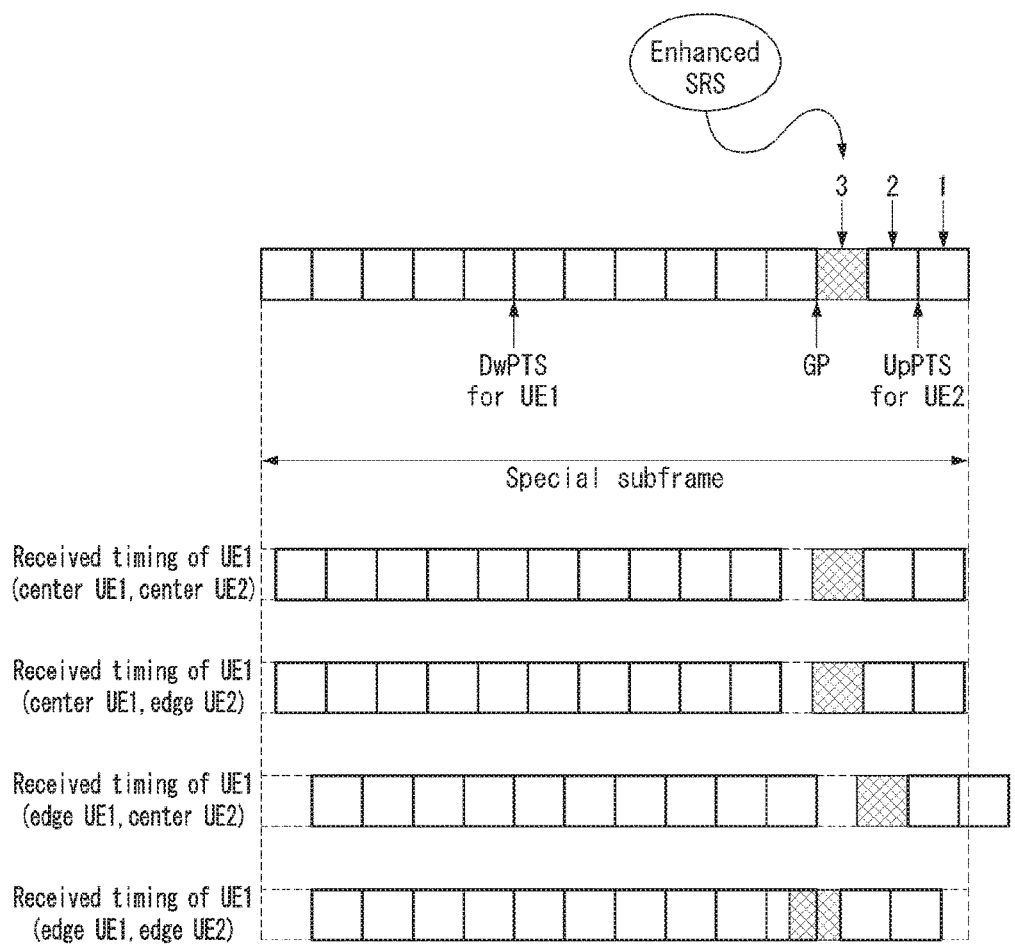
FIG. 14 illustrates reception timing of a scheduled UE in a DwPTS when an enhanced SRS is transmitted in a wireless communication system to which the present invention may be applied.

In order to check the influence of interference between a DwPTS and a new SRS, FIG. 14 illustrates received timing of the DwPTS and the UpPTS when the number of UpPTSs for an SRS is increased. In FIG. 14, a special subframe configuration 7 is taken into consideration. In this case, {10, 2, 2} SC-FDMA symbols correspond to the DwPTS, the GP and the UpPTS. A UE1 is scheduled in the DwPTS, and a UE2 transmits an enhanced SRS at a new UpPTS position. FIG. 14 illustrates reception timing of only the UE1 because the UE2 performs uplink transmission and thus there is no interference issue.

Referring to FIG. 14, when the UE1 and the UE2 are located at the center of a cell, the UE1 receives a DwPTS having small propagation delay. An enhanced SRS is transmitted by the UE2 with small timing advance, and reaches the UE1 with some timing delay. If this is taken into consideration, it may be easily checked from FIG. 14 that the DwPTS is not influenced by interference due to the enhanced SRS.

However, when two UEs located at a cell edge are scheduled in the DwPTS and the UpPTS, respectively, and they become close to each other, an enhanced SRS transmitted by the UE2 acts as interference with the UE1 that receives the DwPTS. The reason for this is that the UE1 receives the DwPTS with larger timing delay and the UE2 transmits the enhanced SRS with larger timing advance and the transmitted enhanced SRS reaches the UE1 early because the enhanced SRSs become close to each other.

The following problems within a scenario may be generated.

1) a situation in which a UE1 and a UE2 are located at the edge of a cell and close to each other
2) a situation in which a UE1 within a cell and a UE2 within a neighbor cell are located at the edges of the cells and close to each other
3) a situation in which a UE1 and a UE2 are located at the edge of a cell and are the same UE In order to handle the problems, the following three approaches may be taken into consideration.

A. Method 1: Approach for Limiting Scheduling

Referring to FIG. 14, if both the UE1 and the UE2 are edge UEs, there is a problem. In order to solve this case, when an edge UE transmits an enhanced SRS on a GP, an eNB may not perform scheduling in a DwPTS for the edge UE. However, as in Scenario 2), if a neighbor cell is taken into consideration, It may be difficult for the eNB to recognize whether a UE scheduled in a neighbor cell is an edge UE without additional negotiation between cells. Therefore, it may be preferred that a center UE is scheduled on the DwPTS regardless of whether the UE transmits the enhanced SRS in the UpPTS.

Likewise, as another method, in order to avoid interference between the DwPTS and the UpPTS, only the center UE may be permitted to transmit the enhanced SRS on the UpPTS.

The aforementioned scheme may have one problem according to a special subframe configuration.

If a special subframe (e.g., a special subframe configuration 8) including a GP having one symbol length is configured, one symbol on a GP is used for an enhanced SRS and a longer GP to be used for propagation delay is not present.

Accordingly, although the UE1 and the UE2 are located at the center of a serving cell, the enhanced SRS transmitted on a new UpPTS may provide interference with the UE1 that performs reception on the DwPTS. Accordingly, in order to use Method 1, it may be necessary to not permit the enhanced SRS within a special subframe including a GP having one symbol.

Method 1 is a simple solving method to the extent that a disadvantage having strong limitation on scheduling is negligible.

B. Method 2: Approach for Reducing the Number of SC-FDMA Symbols within a DwPTS

Another approach is to reduce the number of SC-FDMA symbols within a DwPTS. For this approach, a legacy UE is reconfigured in another special subframe configuration having an SC-FDMA symbol, that is, a smaller number of DwPTSs by an SIB. For an enhanced UE, a special subframe having greater UpPTSs than those of a legacy UE and a DwPTS having the same length as that of the legacy UE may be configured. Furthermore, although an enhanced SRS is transmitted, interference between the DwPTS and the UpPTS can be avoided because a GP is greater than a previous GP. For such an approach, a new special subframe configuration may need to be defined for only an enhanced UE.

Method 2 has an advantage in that it does not apply limitation to scheduling compared to Method 1. However, there is a problem in that resources on the DwPTS are always waster by one symbol per one special subframe.

C. Method 3: Approach for Negotiating Methods 1 and 2

Method 1 has a disadvantage in that it has strong limitation on scheduling, and Method 2 has a disadvantage in that one symbol within a DwPTS is consumed. For a tradeoff method between Methods 1 and 2, a case where only an enhanced UE is configured as a special subframe having smaller DwPTS symbols may be taken into consideration. An eNB still has scheduling limitation on a legacy UE as in Method 1, but the eNB may schedule an enhanced UE regardless of the position of the UE. Furthermore, Method 3 still has a problem in that one symbol is consumed with respect to an enhanced UE like Method 2, and does not have such a problem with respect to a legacy UE.

ii) Enhanced SRS Triggering on an UpPTS

A method of triggering an enhanced SRS on an UpPTS is proposed as follows. In the current standard, k_SRS in Table 6 indicates that which subframe or the symbol of an UpPTS is used for SRS transmission. Since an uplink resource is not present on subframes 0 and 5 in any uplink-downlink configuration within a TDD system, such numbers may indicate one or more symbols within each UpPTS as in Table 6. If three symbols within an UpPTS to be used for an SRS are permitted, it is necessary to indicate a resource using only 10 k_SRS numbers.

10 k_SRS numbers are not necessary to indicate a subframe or UpPTS symbol using k_SRS within some uplink-downlink configurations. For example, four uplink subframes and a maximum of four symbols within two UpPTSs are present within an uplink-downlink configuration 1. After eight resources are indicated, two k_SRSs are left. Such two k_SRSs may be used to indicate a third symbol within the UpPTS. Such a mapping rule between k_SRS and a subframe (or symbol) needs to be different depending on an uplink-downlink configuration.

For SRS transmission, another approach for triggering the third symbol on the UpPTS is a UE-specific method. In Table 6, an UpPTS symbol indicated by k_SRS=0 and k_SRS=1 may be differently construed depending on a UE. For example, One of three combinations for {1, 2}, {2, 3}, {1, 3} UpPTS symbols may be differently configured in UEs. This may be indicated by k_SRS=0 and k_SRS=1.

TABLE 6

| | Subframe index n | | | | | | | | | |
|---|---|---|---|---|---|---|---|---|---|---|
| | 0 | First symbol of UpPTS | Second symbol of UpPTS | 2 | 3 | 4 | 5 | First symbol of UpPTS | Second symbol of UpPTS | 7 | 8 | 9 |
| k_SRS if lengthy of UpPTS is 2 symbols | | 0 | 1 | 2 | 3 | 4 | 5 | 6 | | 7 | 8 | 9 |
| k_SRS if length of UpPTS is 1 symbol | | 1 | | 2 | 3 | 4 | | 6 | | 7 | 8 | 9 | iii) An Increase of Number of SRS Combs or Cyclic Shifts (CS)

An increase of the number of SRS combs or CSs may also increase SRS resources. However, a larger number of SRS combs or CSs may aggravate SRS estimation performance depending on delay spread. In addition, an increase of the number of SRS combs may be sensitive to a frequency-selective channel Therefore, such issues need to be thoroughly reviewed.

iv) 4Tx Antenna Switching for SRS Transmission

In a UE having four antennas that accompany one power amplifier, downlink channel estimation is a difficult problem because the UE does not transmit an SRS through four antennas at the same time.

In order to solve such a problem, 4Tx antenna switching is discussed within SRS transmission. However, this approach has the aging problem of channel estimation. Assuming that N is defined as the product of an SRS period necessary for transmission in a band targeted for one antenna and the number of SRS transmissions, the time that is four times an N transmission time for all of channels is necessary to cover the band. In some case, a required time may exceed the coherence time of a channel. This issue needs to be carefully reviewed before supporting 4TX antenna switching.

v) A Virtual Cell-ID (VCID) for an SRS Sequence

An alternative approach for SRS enhancement is to configure a VCID for SRS sequence generation. In the current standard, only a serving cell-ID is available to generate an SRS sequence. If the use of the VCID is permitted for SRS sequence generation, the opportunity of more additional SRS transmission may be obtained by sacrificing orthogonality between sequences. A downlink DMRS may permit a VCID for an SRS sequence in order to provide more DMRS resources in a code domain. Accordingly, such an alternative approach may become a reasonable solution for SRS capacity enhancement.

A method for another SRS capacity enhancement is described.

What a UE uses which UpPTS symbol(s) region for SRS transmission may be indicated through high layer signaling (e.g., RRC signaling).

For example, in addition to the maximum of two UpPTS symbol(s), N (e.g., N=2 or 4) new UpPTS symbol(s) may be additionally used for SRS transmission. Whether an UpPTS symbol(s) is used for SRS transmission may be configured by high layer signaling (e.g., RRC signaling).

In this case, whether a corresponding UE performs SRS transmission in which UpPTS symbol(s) region may be indicated through high layer signaling (e.g., RRC signaling), using such a method as a legacy UpPTS symbol(s), or a first new UpPTS symbol(s), or a second new UpPTS symbol(s), or . . . for each UE.

In this case, in a legacy signaling method of a form, such as Table 6, if not only a legacy UpPTS symbol(s) region, but the new UpPTS symbol(s) region is indicated, a UE may reinterpret this that the region can also be applied to the corresponding indicated specific UpPTS symbol(s) region. Accordingly, the UE may perform SRS transmission in the UpPTS symbol(s) region indicated by legacy signaling of a form, such as Table 6. Accordingly, there is an advantage in that an implementation of a UE can be maintained so that it is not complicated as much as possible while increasing an SRS capacity in a network viewpoint.

For example, the SRS transmission operation of a UE may be determined by indicating that SRS transmission is performed on which one of the following first, second and third regions for each UE in a UE-specific manner through high layer signaling (e.g., RRC signaling).

First Region: Legacy UpPTS Symbol(s)

In a special subframe structure, such as FIG. 14, the last two SC-FDMA symbols are targets to be taken into consideration. That is, an SRS transmission operation may be performed by applying legacy signaling including Table 6 to the last two SC-FDMA symbols.

Second Region: First New UpPTS Symbol(s)

In a special subframe structure, such as FIG. 14, the last third and fourth two SC-FDMA symbols are targets to be taken into consideration. That is, an SRS transmission operation may be performed by reinterpreting that Table 6 is applied to the last third and fourth two SC-FDMA symbols and applying legacy signaling including Table 6.

Third Region: Second New UpPTS Symbol(s)

In a special subframe structure, such as FIG. 14, fifth and sixth two SC-FDMA symbols are targets to be taken into consideration. That is, an SRS transmission operation may be performed by reinterpreting that Table 6 is applied to the last fifth and sixth two SC-FDMA symbols and applying legacy signaling including Table 6.

In the above description, only the first region to the third region have been illustrated, but this is for convenience of description.

That is, the third region may be excluded from a candidate group, and only the first region and the second region may be selected by high layer signaling (e.g., RRC signaling).

Furthermore, in a technical viewpoint that generalizes and extends this, the fourth region, the fifth region, . . . , may be added in a similar form.

As yet another method, in a trigger type 0 (periodic SRS transmission) or 1 (aperiodic SRS transmission), a new set of RRC parameter values for an additional UpPTS may be configured separately from a legacy SRS configuration. In this case, RRC parameters may be the same as parameters used for a legacy SRS.

Through such a method, a new set of SRS configuration RRC parameters to be applied for each region may be separately configured in a UE.

For example, different sets of a total of K (e.g., K=2) SRS configuration RRC parameters are configured in one UE. In this case, whether all of the corresponding K SRS configuration RRC parameters are applied to the first region (i.e., flexibility is assigned so that an SRS to which two different sets of SRS configuration RRC parameters are applied to a legacy region may be transmitted. For example, periods/offsets are different or combs types are different, etc.), whether all of the corresponding K SRS configuration RRC parameters are applied to each of the first region and the second region or whether all of the corresponding K SRS configuration RRC parameters are applied to the second region may be flexibly configured.

In this case, the set of SRS configuration RRC parameters may be defined in a form including at least one of detailed parameters, such as examples of Table 7 and Table 8.

Table 7 illustrates parameters related to periodic SRS (P-SRS) transmission.

TABLE 7

```
SoundingRS-UL-ConfigDedicated ::= CHOICE{
    release              NULL,
    setup                SEQUENCE {
        srs-Bandwidth         ENUMERATED {bw0, bw1, bw2, bw3},
        srs-HoppingBandwidth  ENUMERATED {hbw0, hbw1, hbw2, hbw3},
        freqDomainPosition    INTEGER (0..23),
        duration              BOOLEAN,
        srs-ConfigIndex       INTEGER (0..1023),
        transmissionComb      INTEGER (0..1),
        cyclicShift           ENUMERATED {cs0, cs1, cs2, cs3, cs4, cs5, cs6, cs7}
    }
}
```

Table 8 illustrates parameters relates to aperiodic SRS (A-SRS) transmission.

TABLE 8

```
SoundingRS-UL-ConfigDedicatedAperiodic-r10 ::=  CHOICE{
    release              NULL,
    setup                SEQUENCE {
        srs-ConfigIndexAp-r10        INTEGER (0..31),
        srs-ConfigApDCI-Format4-r10  SEQUENCE (SIZE (1..3)) OF
SRS-ConfigAp-r10 OPTIONAL,--Need ON
        srs-ActivateAp-r10          CHOICE {
            release              NULL,
            setup                SEQUENCE {
                srs-ConfigApDCI-Format0-r10     SRS-ConfigAp-r10,
                srs-ConfigApDCI-Format1a2b2c-r10  SRS-ConfigAp-r10,
                ...
            }
        }                                               OPTIONAL  --
Need ON
    }
}
```

Referring to Table 7 and Table 8, "srs-Bandwidth" and "srs-BandwidthAp" are configured for periodic SRS transmission and aperiodic SRS transmission, respectively, and are used to determine an SRS frequency bandwidth. "srs-HoppingBandwidth" indicates an SRS hopping bandwidth for periodic SRS transmission, hbw0 corresponds to a 0 value, hbw1 corresponds to a 1 value, and the remainders are the same. "freqDomainPosition" and "freqDomainPositionAp" are configured for periodic SRS transmission and aperiodic SRS transmission, respectively, and are used to determine a frequency domain position for SRS transmission. "duration" indicates duration for periodic SRS transmission, FLASE indicates one transmission, and TRUE indicates "indefinite." "srs-ConfigIndex" and "srs-ConfigIndexAP" are configured for periodic SRS transmission and aperiodic SRS transmission, respectively, and are used to determine a subframe set in which an SRS is transmitted. "transmissionComb" and "transmissionCombAp" are configured for periodic SRS transmission and aperiodic SRS transmission, respectively, and indicate the number of UEs that may be multiplexed with the same SC-FDMA symbol. "cyclicShift" and "cyclicShiftAp" are configured for periodic SRS transmission and aperiodic SRS transmission, respectively, and indicate a cyclic shift value applied to a sequence used for SRS transmission. cs0 corresponds to 0, and the remainders are the same. "srs-ConfigApDCI-Format0", "srs-ConfigApDCI-Format1a2b2c", and "srs-ConfigApDCI-Format4" indicate resource configurations for aperiodic SRS transmission triggered by the DCI formats 0, 1A, 2B, 2C and 4.

In accordance with the above proposed one embodiment, all of the parameter sets (P-SRS and/or A-SRS) are not independently applied to each SRS transmission region, but only some of the parameter sets are independently applied for each region. In other words, only some parameters of the parameter set may be applied to all of the regions in common, and the remaining some parameters may be applied independently for each region.

For example, only "transmissionComb" of the parameters illustrated in Table 7 and Table 8 are independently applied for each SRS transmission region, thereby being capable of increasing scheduling flexibility. And/or only parameters related to "cyclicShift" and/or "srs-ConfigIndex" and/or "SRS bandwidth hopping" may be defined so that they are independently applied for each SRS transmission region or may be configured in a UE. Accordingly, there may be an effect in that scheduling flexibility is improved.

In the Rel-13 FD-MIMO scenario, a new parameter may be introduced to specify an uplink SRS configuration for periodic or aperiodic sounding. An extended information element (IE) including a parameter related to a periodic SRS (e.g., having the name of "SoundingRS-UL-ConfigDedicated-v13xy") may be defined. Furthermore, for a parameter related to an aperiodic SRS, non-critical extension is not sufficient. Accordingly, a new IE having the parameter (e.g., having the name of "SoundingRS-UL-ConfigDedicatedAperiodic-r13") may be introduced.

Table 9 illustrates an SRS uplink configuration (SoundingRS-UL-Config) IE.

TABLE 9

```
SoundingRS-UL-ConfigCommon-v13xy ::=    CHOICE {
    srs-AdditionUpPts-r13         ENUMERATED {sym2,sym4}
}
SoundingRS-UL-ConfigDedicated-v13xy ::=  SEQUENCE {
    combNumber-r13              ENUMERATED {com2, com4},
```

TABLE 9-continued

```
    transmissionComb-r13        INTEGER (0..3),
    cyclicShiftAp-r13           ENUMERATED {cs0, cs1, cs2, cs3, cs4, cs5, cs6,
                                              cs7,cs8,cs9,cs10,cs11}
    }
SoundingRS-UL-ConfigDedicatedAperiodic-r13 ::=    CHOICE{
    release                     NULL,
    setup                       SEQUENCE {
      srs-ConfigIndexAp-r13     INTEGER (0..31),
      srs-ConfigApDCI-Format4-r13     SEQUENCE (SIZE (1..3)) OF SRS-ConfigAp-
r13 OPTIONAL,--Need ON
      srs-ActivateAp-r13        CHOICE {
        release                 NULL,
        setup                   SEQUENCE {
          srs-ConfigApDCI-Format0-r13     SRS-ConfigAp-r13,
          srs-ConfigApDCI-Format1a2b2c-r13     SRS-ConfigAp-r13,
          ...
        }
      }                                             OPTIONAL --
Need ON
    }
}
SRS-ConfigAp-r13 ::= SEQUENCE {
    combNumber-r13              ENUMERATED {com2, com4},
    transmissionCombAp-r13      INTEGER (0..3),
    cyclicShiftAp-r13           ENUMERATED {cs0, cs1, cs2, cs3, cs4, cs5, cs6,
                                              cs7,cs8,cs9,cs10,cs11}
}
-- ASN1STOP
```

Table 10 is a table for illustrating the SRS uplink configuration (SoundingRS-UL-Config) field of Table 9.

TABLE 10

SoundingRS-UL-Config field descriptions combNumber

Indicate the number of combs. In this case, com2 corresponds to 2 combs, and com4 corresponds to 4 combs.
srs-AdditionUpPts Indicate the number of additional UpPTS symbol(s). In this case, sym2 corresponds to two UpPts SC-FDMA symbols, and sym4 corresponds to four UpPts SC-FDMA symbols.

The above contents (i.e., Table 9 and Table 10) show an example in which RRC signaling is configured based on contents determined in the FD-MIMO discussion, and in particular illustrate SRS-related new RRC parameters As another SRS capacity enhancement method, a virtual cell-ID (VCID) for SRS sequence generation may be introduced. That is, the SRS capacity in the code domain can be increased by introducing the VCID. In this case, to this end, an eNB reception scheme, such as the removal (cancel/suppression) of SRS signals generated as different VCIDs in an eNB stage is used, and the ability capable of separating/receiving such SRS transmission signals may be assumed to be present.

In this case, in order to notify a UE of the SRS VCID, the SRS VCID may be recognized by the UE in a form in which the SRS VCID is associated with a VCID, such as another reference signal (e.g., a DMRS or a CSI-RS), other than the SRS. For example, the SRS VCID may be recognized by the UE in a form in which the SRS VCID is associated with a VCID, such as the existing PUSCH DMRS.

As a representative example, if a PUSCH DMRS, a PUCCH DMRS, a CSI-RS and/or a DL-DMRS VCID is configured in a UE, a UE operation may be defined or configured in the UE so that the UE identically recognizes it as an SRS VCID and performs SRS transmission using the SRS VCID.

In the following of the present invention, for convenience of description, a case where a UE recognizes a VCID as an SRS VCID and performs SRS transmission using the VCID if a PUSCH DMRS VCID (0 to 509) is configured in the UE is described as an example.

However, the present invention is not limited to the example and may be generalized and expanded to an operation of performing SRS transmission while operating in conjunction with the VCID configuration of other reference signals. For example, a VCID may be applied as an SRS VCID when a PUSCH DMRS VCID and a PUCCH VCID are equally configured and provided, a VCID may be applied as an SRS VCID when a PUCCH VCID is provided, a VCID may be applied as an SRS VCID when a CSI-RS VCID is provided, or a VCID may be applied as an SRS VCID when a DMRS VCID is provided.

In this case, such enhanced SRS transmission may be defined or configured in a UE so that it is performed on all of transmission modes (TM). In this case, a problem may occur when an enhanced UE, such as Rel-13, accesses a legacy eNB, such as a Rel-11 eNB. That is, for example, the reason for this is that the Rel-11 eNB has configured a PUSCH DMRS VCID for UL CoMP purposes, but the UE may apply the PUSCH DMRS VCID as an SRS VCID and transmit an SRS using the PUSCH DMRS VCID. Accordingly, the present invention additionally proposes a method for preventing this problem.

For example, a definition may be made or configured in a UE so that the UE performs SRS transmission by identically applying a PUSCH DMRS VCID to an SRS VCID when the PUSCH DMRS VCID is configured in the UE only if at least one of the parameters in the following table or Table 9 is RRC configured in the UE (i.e., a parameter related to enhanced SRS transmission is RRC configured).

For example, when a UE receives an RRC configuration, such as Table 11, a definition may be made or configured in the UE so that the UE applies the above operation (i.e., when the UE configures a PUSCH DMRS VCID, it performs an SRS transmission operation by identically applying the PUSCH DMRS VCID to an SRS VCID).

Alternatively, when a UE receives "cyclicShiftAp-r13", that is, a lower message of the RRC message (IE) of Table 11, a definition may be made or configured in the UE so that the UE applies the above operation (i.e., when the UE configures a PUSCH DMRS VCID, it performs an SRS transmission operation by identically applying the PUSCH DMRS VCID to an SRS VCID). The reason for this is that the new introduction of CS 12 can be certainly recognized as enhanced SRS transmission.

TABLE 11

```
SoundingRS-UL-ConfigDedicated-v13xy ::= SEQUENCE {
    combNumber-r13            ENUMERATED {com2, com4},
    transmissionComb-r13      INTEGER (0..3),
    cyclicShiftAp-r13         ENUMERATED {cs0, cs1, cs2, cs3, cs4, cs5,
                                           cs6, cs7,cs8,cs9,cs10,cs11}
}
```

And/or likewise a definition may be made or configured in a UE so that the UE applies the above operation (i.e., when the UE configures a PUSCH DMRS VCID, it performs an SRS transmission operation by identically applying the PUSCH DMRS VCID to an SRS VCID) in the case of an aperiodic SRS or if the UE receives an RRC configuration, such as Table 12.

Alternatively, when a UE receives "cyclicShiftAp-r13", that is, a lower message of the RRC message (IE) of Table 12, a definition may be made or configured in a UE so that the UE applies the above operation (i.e., when the UE configures a PUSCH DMRS VCID, it performs an SRS transmission operation by identically applying the PUSCH DMRS VCID to an SRS VCID). The reason for this is that the new introduction of CS 12 can be certainly recognized as enhanced SRS transmission.

TABLE 12

```
SRS-ConfigAp-r13 ::= SEQUENCE {
    combNumber-r13            ENUMERATED {com2, com4},
    transmissionCombAp-r13    INTEGER (0..3),
    cyclicShiftAp-r13         ENUMERATED {cs0, cs1, cs2, cs3, cs4,
                                           cs5, cs6, cs7,cs8,cs9,cs10,cs11}
}
```

And/or likewise when a UE receives an RRC configuration (or a lower message of the RRC configuration), such as Table 13, a definition may be made or configured in a UE so that the UE applies the above operation (i.e., when the UE configures a PUSCH DMRS VCID, it performs an SRS transmission operation by identically applying the PUSCH DMRS VCID to an SRS VCID).

TABLE 13

```
SoundingRS-UL-ConfigCommon-v13xy ::=    CHOICE {
    srs-AdditionUpPts-r13           ENUMERATED {sym2,sym4}
}
```

And/or likewise when a UE receives an RRC configuration (or a lower message of the RRC configuration), such as Table 14, a definition may be made or configured in a UE so that the UE applies the above operation (i.e., when the UE configures a PUSCH DMRS VCID, it performs an SRS transmission operation by identically applying the PUSCH DMRS VCID to an SRS VCID).

TABLE 14

```
SoundingRS-UL-ConfigDedicatedAperiodic-r13 ::=   CHOICE{
    release                       NULL,
    setup                         SEQUENCE {
        srs-ConfigIndexAp-r13         INTEGER (0..31),
        srs-ConfigApDCI-Format4-r13   SEQUENCE (SIZE (1..3)) OF
    SRS-ConfigAp-r13 OPTIONAL,--Need ON
```

TABLE 14-continued

```
    srs-ActivateAp-r13                   CHOICE {
        release                              NULL,
        setup                                SEQUENCE {
            srs-ConfigApDCI-Format0-r13          SRS-ConfigAp-r13,
            srs-ConfigApDCI-Format1a2b2c-r13     SRS-ConfigAp-r13,
            ...
        }
    }                                    OPTIONAL --
Need ON
    }
}
```

Table 15 is a table for illustrating the RRC parameters illustrated in Table 9 to Table 14.

TABLE 15

| | | |
|---|---|---|
| SoundingRS-UL-ConfigDedicated-extendedUpPTS | SRS configuration parameter for UpPTS extended for trigger type 0 | The same parameter set and range of values as SoundingRS-UL-ConfigDedicated other than the range of modified values of a new parameter (Number-of-combs) and parameter (transmissionComb, cyclicShift) are used. |
| SoundingRS-UL-ConfigDedicatedApediodic-extendedUpPTS | SRS configuration parameter for UpPTS extended for trigger type 1 | The same parameter set and range of values as SoundingRS-UL-ConfigDedicatedAperiodic-r10 other than a new parameter (Number-of-combs) and parameter (transmissionCombAp, cyclicShiftAp) are used. |
| Nuber-of-combs | Indicate the number of combs | ENUMERATED{2combs, 4combs} |
| transmissionComb | Indicate parameter $k\_TC \in \{0,1,2,3\}$ for periodic SRS transmission | INTEGER(0 . . . 3) |
| transmissionCombAp | Indicate parameter $k\_TC \in \{0,1,2,3\}$ for aperiodic SRS transmission | INTEGER(0 . . . 3) |
| cyclicShift | Indicate parameter n_SRS for periodic SRS transmission. | ENUMERATED{cs0, cs1, cs2, cs3, cs4, cs5, cs6, cs7, cs8, cs9, cs10, cs11} |

TABLE 15-continued

| | | |
|---|---|---|
| | In this case, cs0 corresponds to 0 and the remainders are the same | |
| cyclicShiftAp | Indicate parameter n_SRS for aperiodic SRS transmission | ENUMERATED{cs0, cs1,cs2, cs3, cs4, cs5, cs6, cs7, cs8, cs9, cs10, cs11} |

Channel Measurement Restriction and/or Interference Measurement Restriction Configuration Method Channel and Interference Measurement Restriction 1. Introduction A) Definition for Additional Research/Evaluation i) For a given CSI process, when channel and/or interference measurement restriction (MR) is configured (ON), a channel used for CSI evaluation may be estimated from an NZP CSI-RS subframe(s), including even X CSI reference resources.

In this case, the channel measurement may be derived from the NZP CSI-RS.

Furthermore, according to a selected scheme, X may be explicitly configured between 1 and Z_X or may be selected by a UE.

ii) In a given CSI process with a CSI-IM(s), when MR is configured (ON) on interference measurement, interference used for CSI evaluation may be estimated from a Y CSI-IM subframe(s), including even CSI reference resources.

In this case, the interference measurement may be derived from the CSI-IM.

Furthermore, according to a selected scheme, Y may be explicitly configured between 1 and Z_Y or may be selected by a UE.

iii) If a CSI process can be configured without CSI-IM, when MR is configured (ON) on interference measurement in a CSI process given without CSI-IM(s), interference used for CSI evaluation may be estimated from a V subframe(s), including even CSI reference resources.

iv) In a given CSI process, MR may be configured in a high layer in both a channel and interference.

v) Channel and interference MR are independently taken into consideration.

vi) Interference measurement restriction for a CSI process in which CSI-IM is configured or configured without CSI-IM may be independently taken into consideration.

B) Alternative Scheme i) Alt.1: Fixed MR is Active (ON) or Inactive (OFF) Through a High Layer Configuration In this case, X/Y may be previously defined as a single value.

ii) Alt.2: Configurable MR is Active (ON) or Inactive (OFF) Through a High Layer Configuration X={OFF, 1, . . . , N_X} may be configured by a high layer.

Y={OFF, 1, . . . , N_Y} may be configured by a high layer.

iii) Alt.3: CSI Measurement is Periodically Reset.

A reset period and a subframe offset may be configured by a high layer.

In this case, X is selected by a UE between 1 and Z_X, and Z_X is the number of CSI subframes between the last measurement reset (instance) and a CSI reference resource. Furthermore, Y is selected by a UE between 1 and Z_Y, and Z_Y is the number of CSI-IM subframes between the last measurement reset (instance) and a CSI reference resource.

2. Necessity and Possible Scheme for Channel MR

In order to support enhanced beamforming (EBF)/full dimension MIMO (FD-MIMO), the necessity for channel measurement restriction (MR) has been certainly established by contribution for an aperiodic beamformed CSI-RS-based operation and CSI resource polling. With respect to the aperiodic beamformed CSI-RS-based scheme, for example, a network triggers a UE so that the UE reports vertical CSI based on a vertically beamformed CSI-RS, and the network provides instant CSI-RS transmission in a vertical direction at a specific CSI-RS transmission time instance.

Figure 15:
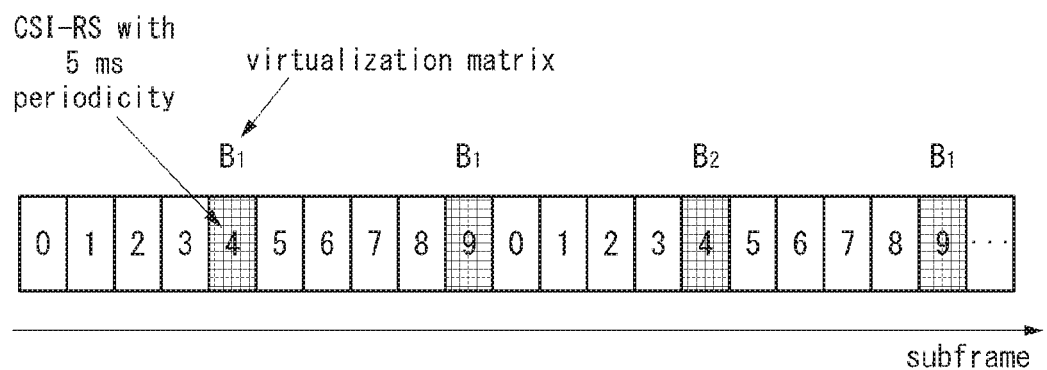
FIG. 15 illustrates aperiodic CSI-RS transmission having multiple virtualization matrices in a wireless communication system to which the present invention may be applied.

Such a mechanism is illustrated in FIG. 15.

FIG. 15 illustrates aperiodic CSI-RS transmission having multiple virtualization matrices in a wireless communication system to which the present invention may be applied.

Referring to FIG. 15, a network may set up a beamformed CSI-RS configuration (e.g., 5 ms period) having multiple virtualization matrices (e.g., Bi of i=1, 2, . . . , K).

In FIG. 15, in the subframe #4 of a second radio frame, the network may trigger a UE so that the UE reports horizontal CSI based on a vertical direction (e.g., a virtualization matrix B_2) different from a previous vertical direction (e.g., a virtualization matrix B_1) within another CSI-RS transmission subframe. Such a CSI-RS configuration may be called instantaneous or aperiodic CSI-RS transmission because it is applied to only such a subframe.

In the aspect of a performance gain of aperiodic CSI-RS transmission, related evaluation results are described later. In this case, a 16.3% gain of average UE throughput and a 32.0% gain of 5% UE throughput are monitored through a fixed beamformed CSI-RS transmission case of high resource utilization (RU).

Proposal 1: channel MR needs to be supported in at least aperiodic beamformed CSI-RS transmission use case based on the monitoring of a sufficiently high throughput gain through existing periodic CSI-RS transmission.

In relation to a method supporting channel MR, single-subframe MR (or one-shot measurement) as the simplest method is sufficient and suitable for channel MR. The reason for this is that although Alt.2 or Alt.3 permitting multiple measurement subframes is used, measurement accuracy is limited to the single-subframe MR case in the worst case. For example, if aperiodic CSI triggering is given in the middle of a measurement interval including such multiple subframes, a UE has to use only some of measurement samples within the measurement interval. More specifically, if the aperiodic CSI triggering is given after the first measurement subframe within the measurement interval, the UE has to use only the first subframe for channel measurement as in the case where only single-subframe MR is permitted. Furthermore, an additional gain of the single-subframe MR is that a measurement sample does not need to be stored through multiple subframes.

Proposal 2: permitting only single-subframe MR is sufficient and suitable to be supported as the simplest option for channel MR.

3. Necessity and Possible Scheme for Interference MR

In order to review whether interference MR is independently required, system level simulation results of a category-2 baseline scheme for both a full buffer and non-full buffer case are described. In each traffic model case, applied interference MR is active (ON) or inactive (OFF).

In the case of MR OFF, interference is calculated based on Equation 14.

$$\hat{I}(n+1)=(1-\alpha)\cdot\hat{I}(n)+\alpha\cdot I(n) \quad\quad \text{[Equation 14]}$$

In this case, I(n) is interference measured in a time n, and Î(n) is averaged interference up to the time n. In the case of MR ON, only I(n) is taken into consideration in simulations as single-subframe (one-shot) interference MR. In this case, (8,2,2,32) antenna configuration and α=0.1 are used.

Table 16 illustrates full buffer simulation results for a category-2 baseline in a 3D-urban micro (3D-UMi) scenario.

TABLE 16

|  | Average UE throughput (bps/Hz) | Average UE throughput ratio | 5% UE throughput (bps/Hz) | 5% UE throughput ratio | 50% UE throughput (bps/Hz) |
|---|---|---|---|---|---|
| MR OFF | 0.184 | — | 0.043 | — | 0.146 |
| MR ON | 0.164 | 89% | 0.029 | 70% | 0.118 |

In the full buffer simulations, overall system performance is aggravated due to single-subframe interference MR. More specifically, Referring to Table 16, performance is reduced, that is, average throughput is reduced by 11%, and 5% UE throughput is reduced by 30%. Due to the interference characteristics of the full buffer simulation, averaging interference measurement over a long period may provide stable interference statistics in deriving more suitable CQI. In contrast, relatively short-term MR for interference measurement aggravates performance compared to the case of MR OFF in the full buffer scenario.

Table 17 illustrates non-full buffer simulation results of the category-2 baseline in the 3D-UMi scenario.

TABLE 17

|  | Average UE throughput (bps/Hz) | average UE throughput ratio | 5% UE throughput (bps/Hz) | 5% UE throughput ratio | 50% UE throughput (bps/Hz) | resource utilization (RU) | FTP load, λ (UEs/s/sector) |
|---|---|---|---|---|---|---|---|
| MR OFF | 4.279 | — | 1.639 | — | 4.762 | 0.14 | 1.5 |
| MR ON | 4.429 | 104% | 1.861 | 114% | 5.000 | 0.13 | |
| MR OFF | 3.284 | — | 0.870 | — | 3.008 | 0.32 | 2.5 |
| MR ON | 3.470 | 106% | 1.003 | 115% | 3.279 | 0.29 | |
| MR OFF | 2.488 | — | 0.406 | — | 2.010 | 0.54 | 3.5 |
| MR ON | 2.619 | 105% | 0.449 | 111% | 2.198 | 0.51 | |

In contrast, the non-full buffer simulation show different results compared to the full buffer case. According to Table 8, the single-subframe interference MR actually improves overall system performance in all of traffic load environments. More specifically, it is monitored that average throughput is about a 5% gain and 5% UE throughput is about a 11-15% gain. In the non-full buffer simulations, interference may suddenly change depending on the traffic load state of a neighbor cell. Accordingly, the single-subframe interference MR may be more suitable for such dynamic interference fluctuations.

As may be seen from Table 16 and Table 17, an interference average effect may give a different influence on system performance depending on the characteristics of interference. If consideration in which the dynamic interference environment of the non-full buffer simulations is more realistic than the static interference environment of the full buffer simulations is taken into consideration, interference MR needs to be introduced to compensate for such different interference environments. Since interference MR is suitable for various interference states, it is preferred that a configurable MR interval more properly meets the different environments for interference measurement as in Alt.2.

Proposal 3: A configurable MR interval may be introduced for interference MR for interference measurement through high layer signaling.

Performance Evaluation for Aperiodic CSI-RS Transmission

Hereinafter, evaluation results for a comparison between three beamformed CSI-RS-based approaches are provided.

i) Approach 1, UE-specific beamforming on a configured CSI-RS resource: in this approach, a serving eNB dynamically changes beamforming weight applied to an NZP CSI-RS resource configured in a UE. When a beamforming change is generated, the UE may receive indication from the eNB explicitly or implicitly so that the UE can reset the start time of a CSI measurement window. Alternatively, the UE may be configured to always restrict its own NZP CSI-RS measurement window (e.g., up to 1 subframe). The interference measurement window may also be used for CSI-IM measurement. Measurement resource limitation for both CSI-IM and a CSI-RS or one of them may also be applied in the frequency domain.

ii) Approach 2, a CSI-RS resource change for channel measurement: in this approach, an M(>1) NZP CSI-RS resource is configured in a UE. An eNB selects an N(>=1) resource(s) for a CSI process from the M resources, and signals the selected resource to the UE. Alternatively, the UE reports N selected CSI-RS resource indices of M configured CSI-RS resources.

iii) Approach 3, aperiodic beamformed CSI-RS: in this approach, a CSI process in which an NZP CSI-RS is actually transmitted is configured in a UE. A CSI-IM measurement instance is controlled by an eNB and signaled to the UE. A measurement window may be configured by high layer signaling.

In a (4, 2, 2, 16) antenna configuration and a cell-specific viewpoint, four candidate vertical beam directions are taken into consideration. One vertical rank is restricted to all of the cases. In each case of Approaches 1, 2 and 3, NZP CSI-RS overhead for each site (including three sectors) is calculated by multiplying a horizontal antenna port (four ports based on an assumed antenna configuration) by a total number of beamformed CSI-RS resource actually transmitted within the site (based on each approach).

In Table 18, resulting average CSI-RS overhead (in an RE/RB/subframe unit) used within simulations for each approach in addition to the number of REs for an NZP and ZP CSI-RS for each site are listed. In this case, an intra-site 3-cell reuse factor is assumed for NZP and ZP CSI-RS allocation. A CSI-RS transmission period is assumed to be 5 ms.

In Table 18, in Approach 1, X is the number of active UEs of each site and requires X UE-dedicated CSI-RS resources. In Approach 2, regardless of the number of active UEs, fixed four beamformed CSI-RS resource overheads are applied in a cell-specific manner. In Approach 3, one CSI-RS resource is configured for an aperiodic CSI-RS in the cycle of 5 ms with respect to a site and is shared between multiple UEs within the site. That is, when multiple UEs are attached to one site, channel estimation performance is reduced and aperiodic CSI-RS transmission cycle for each UE is also increased. Therefore, in Approach 3, CSI-RS overhead is four Res per RB.

Table 18 illustrates CSI-RS overhead assumption for simulations.

TABLE 18

| | Approach 1 | Approach 2 | Approach 3 |
|---|---|---|---|
| Number of RE(s) for NZP and ZP CSI-RS(s) | 4 · X | 4 · 4 · 3 | 4 |
| Average CSI-RS overhead (REs/RB/subframe) | 0.8 · X | 9.6 | 0.8 |

Table 19 illustrates non-full buffer simulation results for Approaches 1, 2 and 3 in the 3D-UMi scenario.

TABLE 19

| | Average UE throughput (bps/Hz) | Average UE throughput gain | 5% UE throughput (bps/Hz) | 5% UE throughput gain | 50% UE throughput (bps/Hz) | Resource utilization (RU) | FTP load, λ (UEs/s/sector) |
|---|---|---|---|---|---|---|---|
| Approach 2-1 | 3.510 | — | 1.130 | — | 3.571 | 0.18 | 1.5 |
| Approach 2-2 | 3.560 | 1.4% | 1.146 | 1.4% | 3.636 | 0.18 | |
| Approach 1 | 3.917 | 11.6% | 1.312 | 16.1% | 4.082 | 0.16 | |
| Approach 3 | 3.863 | 10.1% | 1.286 | 13.8% | 3.960 | 0.17 | |
| Approach 2-1 | 2.338 | — | 0.412 | — | 1.869 | 0.44 | 2.5 |
| Approach 2-2 | 2.397 | 2.5% | 0.454 | 10.1% | 1.951 | 0.39 | |
| Approach 1 | 2.750 | 17.6% | 0.567 | 37.6% | 2.312 | 0.46 | |
| Approach 3 | 2.675 | 14.4% | 0.531 | 28.8% | 2.235 | 0.41 | |
| Approach 2-1 | 1.519 | — | 0.126 | — | 0.926 | 0.74 | 3.5 |
| Approach 2-2 | 1.564 | 3.0% | 0.137 | 9.2% | 0.978 | 0.71 | |
| Approach 1 | 1.709 | 12.5% | 0.150 | 19.7% | 1.124 | 0.76 | |
| Approach 3 | 1.767 | 16.3% | 0.166 | 32.0% | 1.163 | 0.71 | |

Table 19 shows a comparison between the evaluation results of Approaches 1, 2 and 3. As may be seen from Table 19, Approach 2-1 shows the lowest performance due to fixed and the greatest CSI-RS overhead (as in listed in Table 18). Accordingly, Table 19 shows throughput gains for different approaches compared to performance of Approach 2-1 as a reference.

Approach 2-2 shows slightly improved performance compared to Approach 2-1 due to the selection of dynamic N CSI-RS resources of the M candidate CSI-RS resources as described above.

Approaches 1 and 3 show significantly improved performance compared to Approaches 2-1 and 2-2, and show that CSI-RS overhead controlled by aperiodic CSI-RS transmission may cause a significant gain within EBF/FD-MIMO.

In Approach 1, when a new UE is attached to a site as described above, the latency issue of the RRC reconfiguration of a ZP CSI-RS configuration is not taken into consideration in simulations. Accordingly, if such an aspect is taken into consideration, performance results may be aggravated.

Approach 3 shows improved performance compared t Approach 1 in a high RU case. In the aperiodic beamformed CSI-RS transmission case, preferred vertical beams of a UE are grouped, and aperiodic CSI-RS resources are allocated to the grouped vertical beams. Therefore, smaller resources are used for CSI-RS transmission with respect to Approach 3 compared to Approach 1, thereby generally improving performance Such a tendency is significant when active UEs are increased. Accordingly, the highest performance gain is shown in Approach 3, in particular, in a high RU case.

Table 20 illustrates simulations parameters and assumption.

TABLE 20

| Scenario | 3D-UM, that is, inter-site distance (ISD) within 2 GHz = 200 m |
|---|---|
| eNB antenna configuration | Antenna element configuration: 4 × 2 × 2 (+/−45), 0.52 λ horizontal/0.8 λ vertical antenna spacing |
| UE antenna configuration | 2 Rx X-pol (0/+90) |
| System bandwidth | 10 MHz (50 RBs) |
| UE attachment | Based on RSRP (formula) from CRS port 0 |
| Duplex | FDD |
| Network synchronization | Synchronized |
| UE distribution | Comply with TR36.873 |
| UE speed | 3 Km/h |

TABLE 20-continued

| Scenario | 3D-UM, that is, inter-site distance (ISD) within 2 GHz = 200 m |
|---|---|
| Polarized antenna modeling | Model-2 of TR36.873 |
| UE array orientation | $\Omega UT,\alpha$, $\Omega UT,\beta = 90°$, $\Omega UT,\gamma = 0°$ uniformly distributed [0,360] angle |
| UE antenna pattern | Isotropic antenna gain pattern A'(θ',Φ') = 1 |
| Traffic model | FTP model 1 (low ~20% RU, medium ~50% RU, high ~70% RU) having a packet size of 0.5 Mbytes |
| Scheduler | Frequency-selective scheduling (a plurality of UE(s) for each permitted TTI) |
| Receiver | Non-ideal channel estimation and interference modeling, a detailed guideline complies with Rel-12 [71-12] assumption LMMSE-IRC receiver, a detailed guideline complies with Rel-12 [71-12] assumption |
| CSI-RS, CRS | CSI-RS port is mapped to all of TXRUs corresponding to one column of a co-polarized antenna element, CRS port 0 is related to the first column of +45° polarization, and CRS port 0 is associated with first TXRUs |
| Hybrid ARQ (HARQ) | Maximum of 4 transmission |
| Feedback | PUSCH 3-2 CQI, PMI and RI report are triggered every 5 ms Feedback delay is 5 ms Rel-8 4TX codebook for horizontal PMI feedback |

TABLE 20-continued

| Scenario | 3D-UM, that is, inter-site distance (ISD) within 2 GHz = 200 m |
|---|---|
| Overhead | 3 symbol(s) for a DL CCH(s), 2 CRS port(s) and DM-RS in 12 RE(s) for each PRB. CSI-RS overhead is described in Table 9. |
| Transmission method | TM10, a single CSI process, dynamic SU-MIMO (non-CoMP) accompanied by rank adaptation |
| Wrapping method | Based on a geographical distance |
| Handover margin | 3 dB |
| Metrics | Average UE throughput, 5% UE throughput, 50% UE throughput |

Hereinafter, channel measurement restriction is referred to as C-MR, and interference measurement restriction is referred to as I-MR for convenience of description of the present invention.

In accordance with one embodiment of the present invention, C-MR and I-MR may be limited to only a UE in which a new transmission mode (TM) (e.g., TM11) defined for massive MIMO (e.g., FD-MIMO, EBF) transmission has been configured so that the C-MR and I-MR is instructed/configured.

Alternatively, more preferably, since there is no problem in that C-MR and I-MR are applied to other existing TMs in the C-MR and I-MR aspects, it may be more preferred that C-MR and I-MR are applied in a standalone feature. In other words, C-MR and/or I/MR may be configured in a UE in which the existing TM (e.g., TM9 and/or TM10) has been configured, if necessary.

For example, if the new transmission mode (e.g., TM11) is introduced, C-MR and I-MR may be additionally applied to only TM10 additionally. In this case, C-MR ON/OFF and/or I-MR ON/OFF may be independently configured in TM11 and TM10.

Alternatively, the C-MR ON/OFF and/or the I-MR ON/OFF may be applied to TM9 in addition to TM11 and TM10. More specifically, in this case, first, there is no problem in that the C-MR ON/OFF is extended to be applied to TM9. The reason for this is that since channel measurement is performed based on a configured NZP CSI-RS in TM9, the C-MR ON/OFF may be configured even in TM9 in addition to TM10 and TM11 in the C-MR aspect. In contrast, the I-MR ON/OFF may not be configured in TM9. That is, In this case, in TM9, the I-MR OFF state may be always applied to be fixed. In TM9, since an implementation of a UE (not CSI-IM-based in TM10) inevitably performs CRS-based interference measurement, interference is measured using a CRS always transmitted in each subframe. In this case, the reason for this is that if I-MR ON is configured and for example, V=1 (i.e., single-subframe interference measurement restriction) in the definition for the aforementioned I-MR, an operation of performing single-subframe interference measurement at a CSI reference resource (subframe) point is applied. Such an operation may be applied. However, whether an operation of measuring interference in such a manner that I-MR ON is applied and a measured CRS is removed from a received signal in the situation in which a (serving-cell) CRS always transmitted in each subframe can be used can guarantee stable performance improvement in most of environments is unclear. Alternatively, for full flexibility, the I-MR ON/OFF may be applied even in TM9. In this case, the single-subframe measurement method may be applied to only V=1 of the aforementioned various I-MR methods.

Furthermore, in accordance with another embodiment of the present invention, if an enhanced inter-cell interference coordination (eICIC) or enhanced interference management and traffic adaptation (eIMTA) technology is grafted, two or more subframe sets may be configured in a specific CSI process by high layer signaling (e.g., RRC signaling). For example, if the eICIC technology is grafted, a first subframe set may be configured as almost blank subframe (ABS) subframes and a second subframe set may be configured as subframes other than the ABS subframes. For another example, if the eIMTA technology is grafted, a first subframe set may be always configured as subframes, that is, DL subframes, and a second subframe set may be configured as subframes in which DL and UL may be changed.

Hereinafter, a case where two subframe sets are configured in one CSI process is basically described for convenience of description, but the present invention is not thereto.

If a plurality of subframe sets is configured in one CSI process as described above, the C-MR ON/OFF and the I-MR ON/OFF may be independently configured for each subframe set.

In other words, only the C-MR ON/OFF may be independently configured for each subframe set or only the I-MR ON/OFF may be independently configured for each subframe set or both the C-MR ON/OFF and the I-MR ON/OFF may be independently configured for each subframe set.

In this case, the operation of a UE performs restricted channel and/or interference measurement within a corresponding subframe set divided in the entire time for each subframe set. Specially, if the UE has received the configuration of the C-MR ON and/or I-MR ON for a corresponding subframe set from an eNB, the UE should not apply conventional free measurement averaging within the corresponding subframe set, but has to apply restricted measurement averaging based on the configuration of the C-MR ON and/or the I-MR ON (e.g., single-subframe measurement if X=Y=1) to both the channel and interference measurements.

Furthermore, in this operation, the C-MR ON/OFF and the I-MR ON/OFF may be configured for each CSI subframe set in the eICIC viewpoint and/or for each subframe set in the eIMTA viewpoint. That is, the C-MR ON/OFF and the I-MR ON/OFF configured for each subframe set may be individually determined depending on that a subframe set is configured in which viewpoint/situation (e.g., whether the subframe set is configured in the eICIC viewpoint or the eIMTA viewpoint). For example, if a first subframe set and a second subframe set are configured in the eICIC viewpoint and a third subframe set and a fourth subframe set are configured in the eIMTA viewpoint, the C-MR ON/OFF and the I-MR ON/OFF may be configured in each of the first, second, third and fourth subframe sets.

More characteristically, if two subframe sets are configured in a specific CSI process regardless of whether the subframe set is configured in any case, the C-MR ON/OFF and the I-MR ON/OFF may be independently configured for each subframe set. This may be applied to simplify the operation of an UE/eNB.

Furthermore, for an implementation operation of a UE and for the simplification of the configuration of an eNB for the same, although a plurality of subframe sets is configured in a corresponding CSI process, the C-MR ON/OFF and/or the I-MR ON/OFF may be limitedly applied to the plurality of subframe sets in common.

In other words, only the C-MR ON/OFF may be configured to be applied to a plurality of subframe sets in common, only the I-MR ON/OFF may be configured to be applied to a plurality of subframe sets in common, or both the C-MR ON/OFF and the I-MR ON/OFF may be configured to be applied to a plurality of subframe sets in common.

For example, if X=Y=1 is configured in a specific CSI process, single-subframe C-MR ON and I-MR ON may be configured/defined so that it is applied to all of a plurality of corresponding (e.g., two) subframe sets.

For example, dividing the subframe set into a plurality of subframes corresponds to dividing the subframe set into subframes having different measurement characteristics, but in order to simplify the measurement averaging operation of a UE, the same C-MR ON/OFF and/or I-MR ON/OFF operation may be configured for a plurality of corresponding subframe sets having the characteristics of different measurement environments. Accordingly, the UE may perform the same measurement averaging-related operation on each subframe set in common based on a configured C-MR ON/OFF and/or I-MR ON/OFF.

If a plurality of subframe sets is configured in one CSI process as described above, the C-MR ON/OFF and/or the I-MR ON/OFF may be independently configured in the plurality of subframe sets for each subframe set. Furthermore, the C-MR ON/OFF and/or the I-MR ON/OFF may be configured in the plurality of subframe sets in common.

If a plurality of subframe sets is configured in one CSI process by combining the C-MR ON/OFF and/or the I-MR ON/OFF, the C-MR ON/OFF may be independently configured in a plurality of corresponding subframe sets for each subframe set and the I-MR ON/OFF may be configured in a plurality of subframe sets in common. In contrast, if a plurality of subframe sets is configured in one CSI process, the I-MR ON/OFF may be independently configured in a plurality of corresponding subframe sets for each subframe set and the C-MR ON/OFF may be configured in a plurality of subframe sets in common.

Furthermore, as described above, the channel MR for supporting EBF/FD-MIMO showed a high gain, in particular, in the beamformed CSI-RS-based operation and CSI-RS resource polling. Accordingly, in accordance with Proposal 1, since a sufficiently high throughput gain is monitored compared to the existing periodic CSI-RS transmission, it is preferred that at least channel MR is supported at least in an aperiodic beamformed CSI-RS transmission case (i.e., Class B CSI process). Accordingly, the channel MR may be limited so that it is supported only in the beamformed CSI-RS transmission case (i.e., Class B CSI process).

The type of CSI process may be set as any one of Class A and Class B. For example, when the RRC parameter "eMIMO-Type" of a configured CSI-RS configuration within a corresponding CSI process is set as "non-precoded", it may correspond to the CSI-RS configuration (i.e., Class A CSI process) of Class A. If the "eMIMO-Type" is set as "beamformed", it may correspond to the CSI-RS configuration (i.e., Class B CSI process) of Class B.

Furthermore, as described above, the C-MR ON/OFF and the I-MR ON/OFF configured for each subframe set may be individually determined depending on that the subframe set is configured in which viewpoint/situation. This may be extended, and the C-MR ON/OFF and/or the I-MR ON/OFF may be individually determined depending on whether the type of CSI process is Class A or Class B. For example, if the type of CSI process is Class A, the C-MR ON/OFF is not configured and the I-MR ON/OFF may be independently configured for each subframe set. If the type of CSI process is Class B, the C-MR ON/OFF is configured in all of subframe sets in common and the I-MR ON/OFF may be independently configured for each subframe set. For another example, if the type of CSI process is Class A, the C-MR ON/OFF is not configured and the I-MR ON/OFF may be independently configured for each subframe set. If the type of CSI process is Class B, the C-MR ON/OFF and the I-MR ON/OFF may be configured in all of subframe sets in common.

The aforementioned three alternatives are described below again.

i) Alt.1: Fixed MR Through a High Layer Configuration is Active (ON) or Inactive (OFF)

In this case, each of X/Y may be previously defined as a single value.

ii) Alt.2: MR Configurable Through a High Layer Configuration is Active (ON) or Inactive (OFF)

X={OFF, 1, . . . , N_X} may be configured by a high layer.
Y={OFF, 1, . . . , N_Y} may be configured by a high layer.

iii) Alt.3: CSI Measurement is Periodically Reset.

A reset cycle and a subframe offset may be set by a high layer.

In this case, X is selected by a UE between 1 and Z_X, and Z_X is the number of CSI subframes between the last measurement reset (instance) and a CSI reference resource. Furthermore, Y is selected by a UE between 1 and Z_Y, and Z_Y is the number of CSI-IM subframes between the last measurement reset (instance) and a CSI reference resource.

The portions described as X=Y=1 above correspond to the Alt.1-based method. In this case, the Alt.3 or Alt.2-based method may also be taken into consideration in order to obtain performance improvement according to higher measurement averaging than (in particular, in a PUCCH-based periodic CSI report).

However, in order to guarantee the implementation flexibility of a UE so that the implementation complexity of the UE is not greatly increased, the UE may notify an eNB (when the UE is initially attached) whether the UE supports a higher-layer configured measurement window based on Alt.3 (or Alt.2) (i.e., whether the UE has been implemented or not implemented to support the higher-layer configured measurement window) in a form, such as UE capability signaling. That is, an operation based on Alt.3 (or Alt.2) may be selectively performed depending on an implementation of a UE.

This may correspond to a form in which a method (e.g., Alt.3) having higher implementation complexity of a specific UE is defined as an optional feature and/or the UE may notify an eNB whether such an optional feature has been implemented.

And/or such signaling may be additionally limited so that it is applied to only a PUCCH-based periodic CSI report. That is, in a PUSCH-based aperiodic CSI report, only a single specific method (e.g., single-subframe measurement based on Alt.1 and Alt.2 or Alt.3-based method) may be fixedly applied.

Furthermore, if a UE supports a higher-layer configured measurement window based on Alt.3(or Alt.2), the UE may notify an eNB of applicable values of the parameter Z_X and/or Z_Y through associated capability signaling.

For example, a maximum value (and/or a possible value list) of Z_X and/or Z_Y may be fixed (i.e., previously defined) in the standard or may be provided from an eNB to a UE through high layer signaling (e.g., RRC signaling). And/or the UE may notify the eNB of a maximum value (and/or a possible value list) of Z_X and/or Z_Y that may be implemented by the UE through capability signaling. In this case, the eNB may provide an MR-related configuration within the category of available values reported by the UE.

Furthermore, in particular, in the state in which Z_X and/or Z_Y has been given, a UE may notify an eNB of in-depth configurable X and/or Y values through UE capability signaling with respect to possible values of the X and/or the Y that configurable by the eNB. In this case, the eNB may provide an associated configuration within the category of the possible X and/or Y values provided by the UE within a range that the Z_X and/or the Z_Y are not exceeded.

And/or the UE may notify the eNB of a list of a pair form of applicable values of Z_X and/or Z_Y and applicable values of X and/or Y in a capability signaling form. And/also a possible list of such a pair form may be previously defined in the standard or may be configured in the UE.

Furthermore, a definition may be performed in such a manner that only the I-MR-related technology of the MR-related technologies is separately supported and the C-MR-related technology thereof maintains the existing method. On the contrary, a definition may be performed in such a manner that only the C-MR-related technology is separately supported and the I-MR-related technology maintains the existing method. For example, the Alt.2 (or Alt.3) method may be supported with respect to I-MR, but may not be supported with respect to C-MR. On the contrary, the Alt.2 (or Alt.3) method may be supported with respect to C-MR, but may not be supported with respect to I-MR.

Furthermore, a definition may be performed so that C-MR and/or I-MR are separately supported with respect to only the A-CSI report of the MR-related technologies and maintain the existing method with respect to the P-CSI report thereof. On the contrary, a definition may be performed so that C-MR and/or I-MR are separately supported with respect to only the P-CSI report and maintain the existing method with respect to the A-CSI report.

Figure 16:
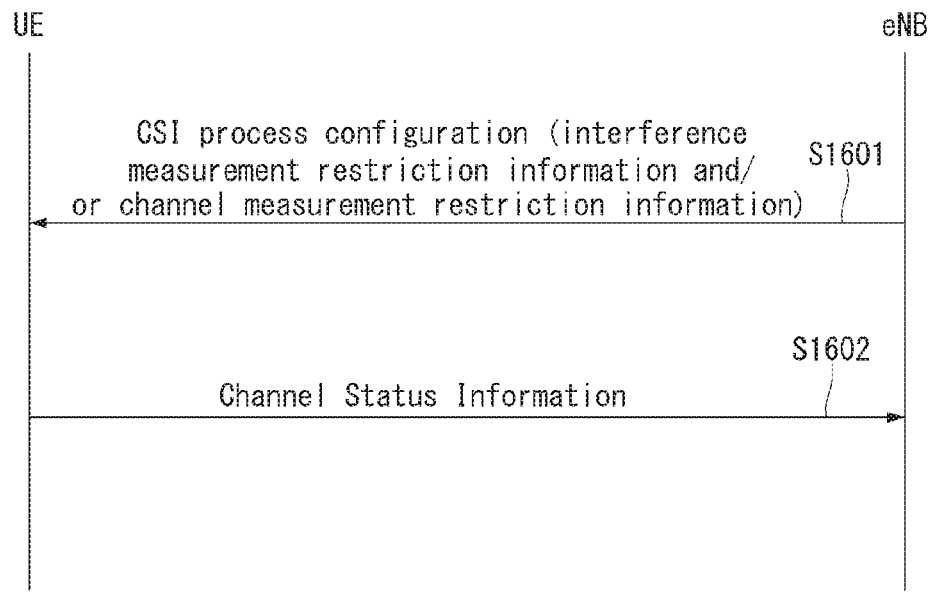
FIG. 16 is a diagram illustrating a method of transmitting/receiving channel state information according to an embodiment of the present invention.

FIG. 16 is a diagram illustrating a method of transmitting/receiving channel state information according to an embodiment of the present invention.

Referring to FIG. 16, a UE receives a CSI process configuration including interference measurement restriction information indicating interference measurement restriction and/or channel measurement restriction information indicating channel measurement restriction (S1601).

In this case, if a plurality of subframe sets (e.g., a first subframe set and a second subframe set) is configured for CSI process (i.e., if a plurality of subframe sets is configured within the same frequency as that of the CSI process), the interference measurement restriction may be independently configured for each of the first subframe set and the second subframe set or the interference measurement restriction may be configured in common with respect to both the first subframe set and the second subframe set.

Furthermore, if a plurality of subframe sets (e.g., a first subframe set and a second subframe set) is configured for a CSI process (i.e., if a plurality of subframe sets is configured within the same frequency as that of the CSI process), the channel measurement restriction may be independently configured for each of the first subframe set and the second subframe set or the channel measurement restriction may be configured in common for both the first subframe set and the second subframe set.

In this case, the channel measurement restriction may be applied to only a CSI process of a beamformed CSI-RS type.

In this case, prior to S1601, the UE may receive a CSI subframe set configuration indicative of the plurality of subframe sets (i.e., the first subframe set and the second subframe set) from an eNB.

The UE reports CSI corresponding to a CSI process configured by the CSI process configuration to the eNB (S1602).

In this case, the CSI may include an RI, a CQI, a PMI and/or a BI (or CRI). As described above, a periodic CSI report or an aperiodic CSI report operation may be performed.

The UE may derive interference measurement and/or channel measurement based on the interference measurement restriction and/or channel measurement restriction configuration configured at step S1601, and may report the CSI corresponding to the CSI process to the eNB.

If the interference measurement restriction is configured at step S1601, the interference measurement may be derived based on only one subframe or a CSI-IM resource belonging to a previously configured measurement window in order to calculate CSI (e.g., a CQI).

Furthermore, if the channel measurement restriction is configured at step S1601, the channel measurement may be derived based on only one subframe or the non-zero power (NZP) CSI-RS of a CSI-RS resource belonging to a previously configured measurement window in order to calculate CSI (e.g., a CQI).

In this case, the UE may transmit UE capability information indicating whether it supports the measurement window with respect to the interference measurement restriction and/or the channel measurement restriction to the eNB prior to step S1601. Such UE capability information may be reported to the eNB with respect to only a physical uplink control channel (PUCCH)-based periodic CSI report.

Furthermore, the UE may negotiate a parameter (e.g., the parameters Z_X and/or Z_Y, X and/or Y) for determining the measurement window for the interference measurement restriction and/or the channel measurement restriction with the eNB prior to step S1601.

General Apparatus to which the Present Invention May be Applied

Figure 17:
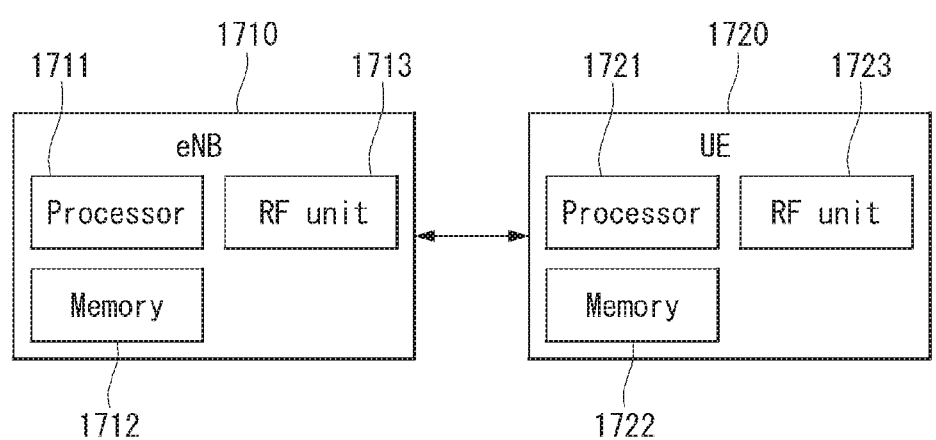
FIG. 17 illustrates a block diagram of a wireless communication apparatus according to an embodiment of the present invention.

FIG. 17 illustrates a block diagram of a wireless communication apparatus according to an embodiment of the present invention.

Referring to FIG. 17, the wireless communication system includes a base station (eNB) 1710 and a plurality of user equipments (UEs) 1720 located within the region of the eNB 1710.

The eNB 1710 includes a processor 1711, a memory 1712 and a radio frequency unit 1713. The processor 1711 implements the functions, processes and/or methods proposed in FIGS. 1 to 16 above. The layers of wireless interface protocol may be implemented by the processor 1711. The memory 1712 is connected to the processor 1711, and stores various types of information for driving the processor 1711. The RF unit 1713 is connected to the processor 1711, and transmits and/or receives radio signals.

The UE 1720 includes a processor 1721, a memory 1722 and a radio frequency unit 1723. The processor 1721 implements the functions, processes and/or methods proposed in FIGS. 1 to 16 above. The layers of wireless interface protocol may be implemented by the processor 1721. The memory 1722 is connected to the processor 1721, and stores various types of information for driving the processor 1721. The RF unit 1723 is connected to the processor 1721, and transmits and/or receives radio signals.

The memories 1712 and 1722 may be located interior or exterior of the processors 1711 and 1721, and may be connected to the processors 1711 and 1721 with well known means. In addition, the eNB 1710 and/or the UE 1720 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The present invention has been described based on an example in which it is applied to the 3GPP LTE/LTE-A systems, but may be applied to various wireless communication systems in addition to the 3GPP LTE/LTE-A systems.

What is claimed is:

1. A method of reporting channel state information (CSI), by a user equipment (UE) in a wireless communication system, the method comprising:
   receiving, from an eNB, a CSI process configuration comprising interference measurement restriction information for interference measurement restriction;
   reporting, to the eNB, CSI for a CSI process configured by the CSI process configuration,
   wherein when a first subframe set and a second subframe set are configured for the CSI process, the interference measurement restriction is independently configured for each of the first subframe set and the second subframe set, and
   transmitting UE capability related to whether a measurement window is supported for the interference measurement restriction to the eNB, wherein the measurement window is pre-configured to calculate a channel quality indicator (CQI),
   wherein when the interference measurement restriction is configured, interference measurement is derived based on a channel state information-interference measurement (CSI-IM) resource belonging to the measurement window.

2. The method of claim 1, wherein:
   the CSI process configuration comprises channel measurement restriction information for channel measurement restriction, and
   the channel measurement restriction is configured in common for the first subframe set and the second subframe set.

3. The method of claim 2, wherein the channel measurement restriction is applied to only a CSI process of a beamformed CSI-RS type.

4. The method of claim 1, wherein when the interference measurement restriction is configured, interference measurement is derived based on a channel state information-interference measurement (CSI-IM) resource of only one subframe in order to calculate a channel quality indicator (CQI).

5. The method of claim 2, wherein when the channel measurement restriction is configured, channel measurement is derived based on a non-zero power (NZP) CSI-RS of a channel state information-reference signal (CSI-RS) resource of only one subframe in order to calculate a channel quality indicator (CQI).

6. The method of claim 2, wherein when the channel measurement restriction is configured, channel measurement is derived based on a non-zero power (NZP) CSI-RS of a channel state information-reference signal (CSI-RS) resource belonging to the measurement window.

7. The method of claim 6, the UE capability further includes information for whether the measurement window is supported for the channel measurement restriction to the eNB.

8. The method of claim 7, wherein the user equipment capability information is transmitted to the eNB for only a physical uplink control channel (PUCCH)-based periodic CSI report.

9. The method of claim 6, further comprising negotiating a parameter for determining the measurement window for the interference measurement restriction and/or the channel measurement restriction with the eNB.

10. A user equipment transmitting channel state information (CSI) in a wireless communication, the user equipment comprising:
    a radio frequency (RF) unit for transmitting/receiving a radio signal; and
    a processor controlling the RF unit,
    wherein the processor is configured to receive, from an eNB, a CSI process configuration comprising interference measurement restriction information for interference measurement restriction and to report, to the eNB, CSI for a CSI process configured by the CSI process configuration, and
    when a first subframe set and a second subframe set are configured for the CSI process, the interference measurement restriction is independently configured for each of the first subframe set and the second subframe set,
    wherein the processor transmits UE capability related to whether a measurement window is supported for the interference measurement restriction to the eNB, wherein the measurement window is pre-configured to calculate a channel quality indicator (CQI), wherein when the interference measurement restriction is configured, the processor derives interference measurement based on a channel state information-interference measurement (CSI-IM) resource belonging to the measurement window.

11. The user equipment of claim 10, wherein:

the CSI process configuration comprises channel measurement restriction information for channel measurement restriction, and the channel measurement restriction is configured in common for the first subframe set and the second subframe set.

12. The user equipment of claim 11, wherein the channel measurement restriction is applied to only a CSI process of a beamformed CSI-RS type.

* * * * *